(12) United States Patent
Brice, Jr. et al.

(10) Patent No.: US 7,174,550 B2
(45) Date of Patent: Feb. 6, 2007

(54) SHARING COMMUNICATIONS ADAPTERS ACROSS A PLURALITY OF INPUT/OUTPUT SUBSYSTEM IMAGES

(75) Inventors: Frank W. Brice, Jr., Hurley, NY (US); Charles W. Gainey, Jr., Poughkeepsie, NY (US); Beth Glendening, Poughkeepsie, NY (US); Marten J. Halma, Poughquag, NY (US); Jeffrey P. Kubala, Poughquag, NY (US); Hans-Helge Lehmann, Weil im Schoenbuch (DE); Tan Lu, Poughkeepsie, NY (US); Allan S. Meritt, Poughkeepsie, NY (US); Ugochukwo Njoku-Charles, Bronx, NY (US); Kenneth J. Oakes, Wappingers Falls, NY (US); Charles E. Shapley, Salt Point, NY (US); John S. Trotter, Pleasant Valley, NY (US); Leslie W. Wyman, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/435,955

(22) Filed: May 12, 2003

(65) Prior Publication Data
US 2004/0230713 A1 Nov. 18, 2004

(51) Int. Cl.
*G06F 9/44* (2006.01)
*G06F 9/46* (2006.01)
*G06F 13/00* (2006.01)
*G06F 15/177* (2006.01)

(52) U.S. Cl. .............. 718/1; 710/2; 710/5; 710/8; 710/15; 710/36; 710/62; 710/72; 710/305; 709/205; 709/225; 719/319; 713/1; 713/2

(58) Field of Classification Search ............. 710/305, 710/306, 2, 5, 8, 15, 36, 62–64, 72–74; 709/225, 709/205; 719/319; 718/1; 713/1, 2, 100
See application file for complete search history.

(56) References Cited

U.S. PATENT DOCUMENTS

| | | | | |
|---|---|---|---|---|
| 3,693,161 A | 9/1972 | Price et al. | ............. | 340/172.5 |
| 4,207,609 A | 6/1980 | Luiz et al. | ................. | 364/200 |
| 4,564,903 A | 1/1986 | Guyette et al. | ............. | 364/300 |
| 4,843,541 A | 6/1989 | Bean et al. | ................ | 364/200 |

(Continued)

OTHER PUBLICATIONS

"z/Architecture—Principles of Operation," SA22-7832-01, International Business Machines Corporation, Second Edition, Oct. 2001.

(Continued)

*Primary Examiner*—Tanh Q. Nguyen
(74) *Attorney, Agent, or Firm*—Eugene I. Shkurko, Esq.; Blanche E. Schiller, Esq.; Heslin Rothenberg Farley & Mesiti P.C.

(57) ABSTRACT

A communications adapter is shared by a plurality of input/output (I/O) subsystem images of an I/O subsystem of a central processing complex. To enable the sharing, the communications adapter is configured to a plurality of I/O paths of the plurality of I/O subsystem images. An I/O subsystem may have one or more shared communications adapters.

32 Claims, 13 Drawing Sheets

U.S. PATENT DOCUMENTS

| | | |
|---|---|---|
| 5,170,472 A | 12/1992 | Cwiakala et al. ............ 395/275 |
| 5,185,736 A | 2/1993 | Tyrrell et al. .................. 370/55 |
| 5,297,262 A | 3/1994 | Cox et al. .................... 395/325 |
| 5,317,739 A | 5/1994 | Elko et al. ................... 395/650 |
| 5,414,851 A | 5/1995 | Brice, Jr. et al. ........... 395/650 |
| 5,452,455 A | 9/1995 | Brown et al. ............... 395/700 |
| 5,526,484 A | 6/1996 | Casper et al. .......... 395/200.14 |
| 5,537,574 A | 7/1996 | Elko et al. ................... 396/468 |
| 5,548,791 A | 8/1996 | Casper et al. ............... 395/858 |
| 5,564,040 A | 10/1996 | Kubala .................. 395/497.04 |
| 5,568,648 A | 10/1996 | Coscarella et al. ......... 395/862 |
| 5,584,039 A | 12/1996 | Johnson et al. ............. 395/826 |
| 5,600,805 A | 2/1997 | Fredericks et al. .......... 395/825 |
| 5,640,603 A | 6/1997 | Meritt et al. ................. 395/858 |
| 5,644,712 A | 7/1997 | Coscarella et al. .... 395/200.01 |
| 5,680,580 A | 10/1997 | Beardsley et al. ........... 395/489 |
| 5,793,983 A | 8/1998 | Albert et al. ........... 395/200.69 |
| 5,845,146 A | 12/1998 | Onodera ..................... 395/822 |
| 5,907,684 A | 5/1999 | Halma et al. .......... 395/200.67 |
| 5,996,026 A | 11/1999 | Onodera et al. ................ 710/3 |
| 6,125,411 A | 9/2000 | Sato ............................. 710/38 |
| 6,195,330 B1 | 2/2001 | Sawey et al. ................ 370/220 |
| 6,240,467 B1 | 5/2001 | Beardsley et al. ............. 710/5 |
| 6,397,260 B1 | 5/2002 | Wils et al. .................. 709/238 |
| 2004/0083356 A1 | 4/2004 | Chatterjee et al. ............. 713/1 |

OTHER PUBLICATIONS

"z/Series—Input/Output Configuration Program User's Guide for IYP IOCP," SB10-7029-03, International Business Machines, Fourth Edition, Aug. 2002.

"Method And Apparatus For A Non-Disruptive Recovery Of A Single Partition In A Multipartitioned Data Processing System", U.S. Appl. No. 10/043,489, filed Jan. 11, 2002.

"Methods And Apparatus For Obtaining Multiple Port Addresses By A Fibre Channel From A Network Fabric", U.S. Appl. No. 10/006,948, filed Dec. 3, 2001.

WHEN OC=0 (ADD CHPID TO I/O-CONFIGURATION DEFINITION)
  CSSID SPECIFIES CSS IMAGE WHERE CHPID IS TO BE ADDED.
  IF CSSID IS NOT VALID,
    PROVIDE APPROPRIATE RESPONSE CODE.
  PCHID SPECIFIES PHYSICAL CHANNEL PATH TO WHICH CHPID
    WILL BIND.
  IF PCHID IS NOT VALID,
    PROVIDE APPROPRIATE RESPONSE CODE.
  IF PCHID IS ALREADY ADDED TO I/O-CONFIGURATION
    DEFINITION, PROVIDE APPROPRIATE RESPONSE CODE.
  CHECKING OK, ADD CHPID TO CSS IMAGE.
    SUCCESSFUL RESPONSE CODE INDICATED.

*fig. 6C*

WHEN OC=1 (MODIFY CHPID) AND OCQ=7 (ADD CSS-IMAGE ACCESS)
  CSSID SPECIFIES TARGET CSS IMAGE WHERE CHPID SHOULD
    NOT EXIST, AND IS TO BE ADDED.
  RCSSID SPECIFIES A REFERENCE CSS IMAGE WHERE A
    CHPID-TO-PCHID DEFINITION ALREADY EXISTS
  IF CSSID IS NOT VALID,
    PROVIDE APPROPRIATE RESPONSE CODE.
  IF RCSSID IS NOT VALID,
    PROVIDE APPROPRIATE RESPONSE CODE.
  IF CSSID=RCSSID,
    PROVIDE APPROPRIATE RESPONSE CODE.
  IF CHPID NOT IN CSS IMAGE SPECIFIED BY RCSSID,
    PROVIDE APPROPRIATE RESPONSE CODE.
  IF CHPID ALREADY IN CSS IMAGE SPECIFIED BY CSSID,
    PROVIDE APPROPRIATE RESPONSE CODE.
  IF CHPID IN RCSSID IS NOT SPANNABLE CHANNEL-PATH TYPE,
    PROVIDE APPROPRIATE RESPONSE CODE.
  IF CHPID IN RCSSID IS SPANNABLE BUT NOT DEFINED AS
    SHARED, PROVIDE APPROPRIATE RESPONSE CODE.
  CHECKING OK, ADD CHPID TO CSS IMAGE(CSSID) AND BIND TO
    PCHID ALREADY BOUND TO CHPID IN REFERENCE CSS IMAGE
    (RCSSID). SUCCESSFUL RESPONSE CODE INDICATED.

*fig. 6D*

WHEN OC=1 (MODIFY CHPID) AND OCQ=8 (DELETE CSS-IMAGE ACCESS)
  CSSID SPECIFIES TARGET CSS IMAGE WHERE CHPID SHOULD
    EXIST, AND IS TO BE DELETED.
  IF CSSID IS NOT VALID,
    PROVIDE APPROPRIATE RESPONSE CODE.
  IF CHPID NOT IN CSS IMAGE SPECIFIED BY CSSID,
    PROVIDE APPROPRIATE RESPONSE CODE.
  IF CHPID IN CSS IMAGE SPECIFIED BY CSSID IS NOT
    DECONFIGURED, PROVIDE APPROPRIATE RESPONSE CODE.
  IF CHPID IN CSS IMAGE SPECIFIED BY CSSID IS LAST
    CHPID.PCHID BIND, PROVIDE APPROPRIATE RESPONSE CODE.
  CHECKING OK, DELETE CHPID FROM CSS IMAGE (CSSID).
    SUCCESSFUL RESPONSE CODE INDICATED.

fig. 6E

WHEN OC=2 (DELETE CHPID FROM I/O-CONFIGURATION DEFINITION)
  IF CSSID IS NOT VALID,
    PROVIDE APPROPRIATE RESPONSE CODE.
  IF CHPID NOT IN CSS IMAGE SPECIFIED BY CSSID,
    PROVIDE APPROPRIATE RESPONSE CODE
  IF CHPID IN CSS IMAGE SPECIFIED BY CSSID IS NOT
    DECONFIGURED, PROVIDE APPROPRIATE RESPONSE CODE.
  IF CHPID IN CSS IMAGE SPECIFIED BY CSSID IS NOT LAST
    CHPID.PCHID BIND, PROVIDE APPROPRIATE RESPONSE CODE.
  CHECKING OK, DELETE CHPID FROM CSS IMAGE (CSSID).
    SUCCESSFUL RESPONSE CODE INDICATED.

SHARING COMMUNICATIONS ADAPTERS ACROSS A PLURALITY OF INPUT/OUTPUT SUBSYSTEM IMAGES

CROSS-REFERENCE TO RELATED APPLICATIONS

"MULTIPLE LOGICAL INPUT/OUTPUT SUBSYSTEM FACILITY," Brice et al., Ser. No. 10/436,021, filed May 12, 2003;

"MANAGING INPUT/OUTPUT SUBSYSTEM IMAGES OF AN INPUT/OUTPUT SUBSYSTEM," Brice et al., Ser. No. 10/435,773, filed May 12, 2003;

"METHOD, SYSTEM AND PROGRAM PRODUCTS FOR ENHANCING INPUT/OUTPUT PROCESSING FOR OPERATING SYSTEM IMAGES OF A COMPUTING ENVIRONMENT," Brice et al., Ser. No. 10/435,975, filed May 12, 2003;

"METHOD, SYSTEM AND PROGRAM PRODUCTS FOR IDENTIFYING COMMUNICATIONS ADAPTERS OF A COMPUTING ENVIRONMENT," Brice et al., Ser. No. 10/436,385, filed May 12, 2003; and "MANAGING ACCESS, BY OPERATING SYSTEM IMAGES OF A COMPUTING ENVIRONMENT, OF INPUT/OUTPUT RESOURCES OF THE COMPUTING ENVIRONMENT," Brice et al. Ser. No. 10/436,240, filed May 12, 2003.

TECHNICAL FIELD

This invention relates, in general, to input/output (I/O) processing, and in particular, to extending the functionality of input/output subsystems used in I/O processing.

BACKGROUND OF THE INVENTION

In various computing systems, such as the eServer zSeries and ESA/390 systems, offered by International Business Machines Corporation, Armonk, N.Y., a facility, referred to as the Multiple Image Facility (MIF), is provided. This facility enables the transparent sharing of channels of a given channel subsystem by multiple operating system images of a central processing complex (CPC). In particular, a CPC executing under logical partitioning control is partitioned into a plurality of logical partitions, which are coupled to the same channel subsystem of the CPC. Through MIF, channels of the channel subsystem are shared by the logical partitions, and thus, the operating systems executing therein, coupled to the channel subsystem. One embodiment of this sharing is described in, for instance, U.S. Pat. No. 5,414,851, entitled "Method and Means for Sharing I/O Resources By A Plurality Of Operating Systems," Brice, Jr. et al., issued May 9, 1995, which is hereby incorporated herein by reference in its entirety.

Although the Multiple Image Facility enables the sharing of channels between operating system images of a CPC configured to the same channel subsystem, a need still exists for a capability that extends the sharing of channels. For example, a need exists for a capability that enables the sharing of channels and/or other communications adapters between operating system images configured to different I/O subsystem images of the CPC.

SUMMARY OF THE INVENTION

The shortcomings of the prior art are overcome and additional advantages are provided through the provision of a method of enhancing input/output processing of a computing environment. The method includes, for instance, assigning a communications adapter to an input/output (I/O) subsystem image of an I/O subsystem of the computing environment; and assigning the communications adapter to another I/O subsystem image of the I/O subsystem, wherein the I/O subsystem image and the another I/O subsystem image share the communications adapter.

In a further aspect of the present invention, a method of enhancing input/output processing of a computing environment is provided. The method includes, for instance, sharing a communications adapter by multiple I/O subsystem images of a plurality of I/O subsystem images of an I/O subsystem of the computing environment, wherein an I/O subsystem image appears to a program of the computing environment as an independent I/O subsystem.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 6c–6f depict various checks that are performed during execution of the change channel path configuration command, in accordance with an aspect of the present invention;

BEST MODE FOR CARRYING OUT THE INVENTION

In accordance with an aspect of the present invention, a facility is provided in which a communications adapter (e.g., a physical channel) is shared by a plurality of I/O subsystem images (e.g., channel subsystem images) of a physical input/output subsystem (e.g., channel subsystem). For example, a physical input/output subsystem is configured as a plurality of input/output subsystem images in order to logically expand the functionality of the input/output subsystem, and one or more communications adapters are shared by a plurality of those subsystem images. This is referred to herein as spanning.

Figure 1A:
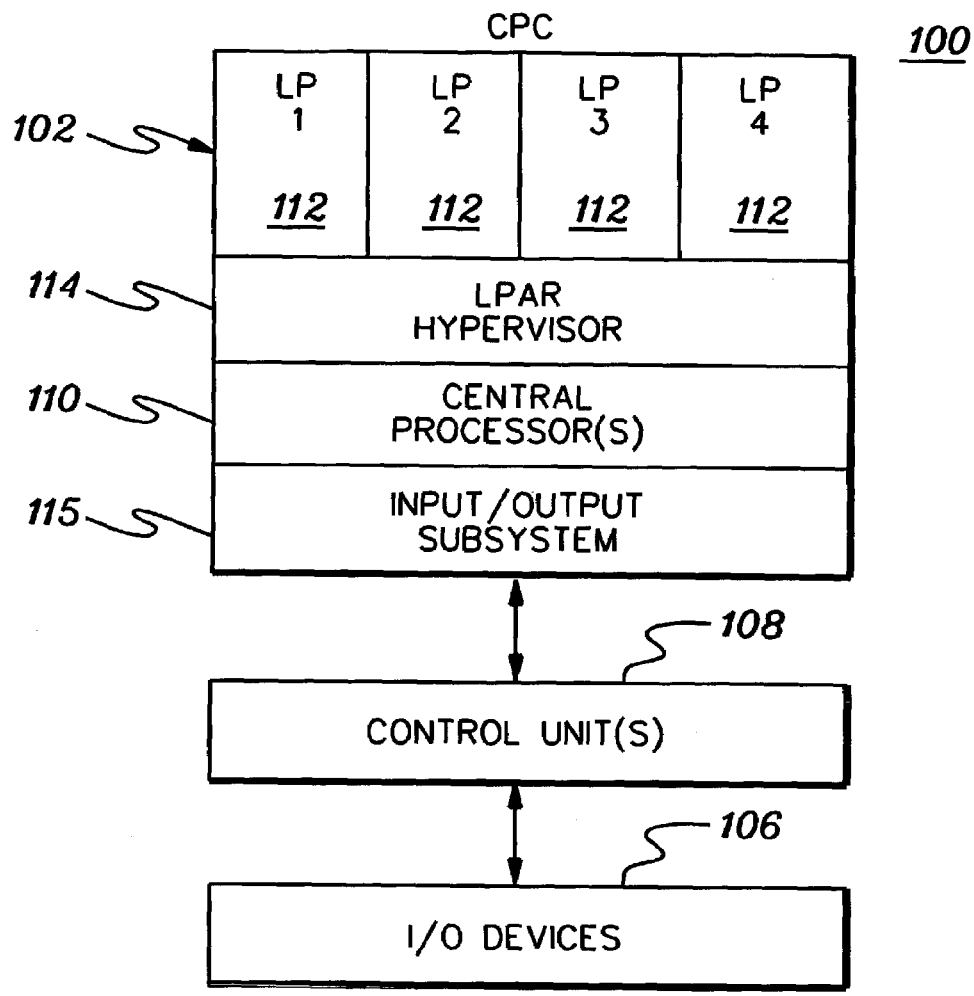
FIG. 1a depicts one embodiment of a computing environment to incorporate and use one or more aspects of the present invention.

One embodiment of a computing environment to incorporate and use one or more aspects of the present invention is described with reference to FIG. 1a. In one example, computing environment 100 is based on the z/Architecture, offered by International Business Machines Corporation, Armonk, N.Y. The z/Architecture is described in an IBM Publication entitled "z/Architecture Principles of Operation," Publication No. SA22-7832-01, October 2001, which is hereby incorporated herein by reference in its entirety.

As one example, computing environment 100 includes a central processor complex (CPC) 102 coupled to one or more input/output (I/O) devices 106 via one or more control units 108. Central processor complex 102 includes, for instance, one or more central processors 110, one or more partitions 112 (e.g., logical partitions (LP)), a logical partition hypervisor 114, and an input/output subsystem 115, each of which is described below.

Central processors 110 are physical processor resources allocated to the logical partition. In particular, each logical partition 112 has one or more logical processors, each of which represents all or a share of a physical processor 110 allocated to the partition. The physical processors to which the logical processors are dispatched (by the hypervisor) may be either dedicated to a given partition's logical processors or shared by logical processors configured to multiple sharing logical partitions.

A logical partition functions as a separate system and has one or more applications and a resident operating system therein, which may differ for each logical partition. In one embodiment, the operating system is the z/OS operating system, the z/VM operating system, the z/Linux operating system or the TPF operating system, offered by International Business Machines Corporation, Armonk, N.Y.

Logical partitions 112 are managed by a logical partition hypervisor 114, which is implemented by Licensed Internal Code running on processors 110. The logical partitions and logical partition hypervisor each comprise one or more programs residing in respective partitions of central storage associated with the central processors. One example of logical partition hypervisor 114 is the Processor Resource/System Manager (PR/SM), offered by International Business Machines Corporation, Armonk, N.Y. Further details regarding logical partitions are described in, for instance, Guyette et al., U.S. Pat. No. 4,564,903, entitled "Partitioned Multiprocessor Programming System," issued on Jan. 14, 1986; Bean et al., U.S. Pat. No. 4,843,541, entitled "Logical Resource Partitioning Of A Data Processing System," issued on Jun. 27, 1989; and Kubala, U.S. Pat. No. 5,564,040, entitled "Method And Apparatus For Providing A Server Function In A Logically Partitioned Hardware Machine," issued on Oct. 8, 1996, each of which is hereby incorporated herein by reference in its entirety.

Input/output subsystem 115 directs the flow of information between input/output devices 106 and main storage. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can incorporate and use one or more aspects of the present invention.

Figure 1B:
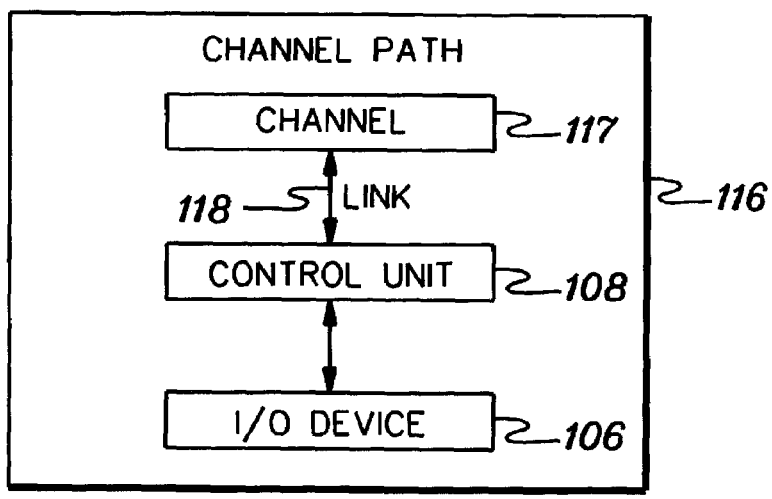
FIG. 1b depicts one example of an I/O path (e.g., a channel path) used for communications in the computing environment of FIG. 1a, in accordance with an aspect of the present invention.

The I/O subsystem uses one or more input/output paths as communication links in managing the flow of information to or from input/output devices 106. In this particular example, these paths are called channel paths, since the communications adapters are channels. Each channel path 116 (FIG. 1b) includes a channel 117 of channel subsystem 115, a control unit 108, a link 118 (e.g., serial or parallel) between the channel and control unit, and one or more I/O devices 106 coupled to the control unit. In other embodiments, channel paths may have multiple control units and/or other components. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled, "Method And System For Pipelining The Processing Of Channel Command Words," issued on Jun. 11, 1996, which is hereby incorporated herein by reference in its entirety.

A control unit may be accessible by the channel subsystem by more than one channel path. Similarly, an I/O device may be accessible by the channel subsystem through more than one control unit, each having one or more channel paths to the channel subsystem. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

The I/O device attached to the control unit may be designed to perform certain limited operations, or it may perform many different operations. To accomplish its operations, the device uses detailed signal sequences peculiar to its type of device. The control unit decodes the commands received from the channel subsystem, interprets them for the particular type of device, and provides the signal sequence required for the performance of the operation.

In addition to one or more channels, a channel subsystem includes one or more subchannels. Each subchannel is provided for and dedicated to an I/O device, or group of I/O devices, coupled to the program through the channel subsystem. Each subchannel provides information concerning the associated I/O device, or group of I/O devices, and its attachment to the channel subsystem. The subchannel also provides information concerning I/O operations and functions involving the associated I/O device, or group of I/O devices. The subchannel provides a logical appearance of a device or group of devices to the program and is the means by which the channel subsystem provides information about associated I/O devices to the central processors, which obtain this information by executing I/O instructions. The subchannel has internal storage that includes information in the form of a channel command word (CCW) address, a channel path identifier, device number, count, status indication and I/O interruption subclass code, as well as information on path availability and functions pending or being performed. I/O operations are initiated with a device by the execution of I/O instructions that designate the subchannel associated with the device or devices.

Figure 1C:
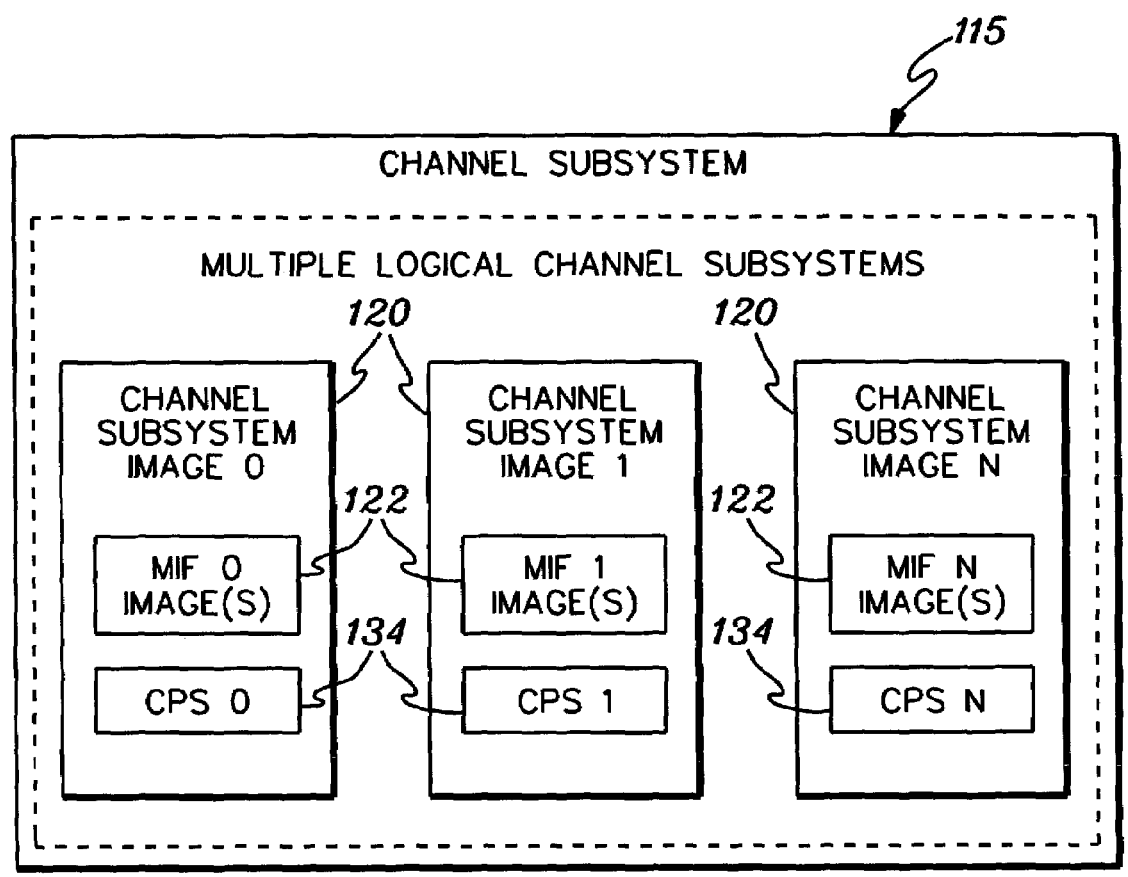
FIG. 1c depicts one embodiment of an example of an I/O subsystem (e.g., a channel subsystem) of FIG. 1a being configured as a plurality of I/O subsystem (e.g., channel subsystem) images, in accordance with an aspect of the present invention.

Further details regarding a channel subsystem are described with reference to FIG. 1c. A channel subsystem 115 (or other I/O subsystem) is configured as a plurality of channel subsystem images 120 (or other I/O subsystem images), each identified by a channel subsystem image identifier (CSSID) (or other I/O subsystem identifier). In one example, the channel subsystem is configured, either by model dependent means, in which configuration controls are used during initialization, or by use of appropriate dynamic I/O configuration commands, as one to 256 channel subsystem images. Each channel subsystem image appears to a program as a complete channel subsystem. Each channel subsystem image may have, for instance, from 1 to 256 unique channel paths, thereby increasing the maximum number of channel paths that may be configured to the channel subsystem from 256 to 65,536. The configuring of the channel subsystem as a plurality of channel subsystem images is facilitated by a Multiple Channel Subsystem facility (MCSS), one embodiment of which is described in a U.S. patent application entitled "Multiple Logical Input/Output Subsystem Facility," Brice et al., (IBM Docket No. POU920020071US1), filed herewith and incorporated herein by reference in its entirety.

A channel subsystem image 120 includes, for instance, a multiple image facility (MIF) 122, which includes one or more (e.g., up to 16) MIF images, each identified by a MIF image identifier (IID). The multiple image facility allows each logical partition to achieve independent access to the channel paths, control units and I/O devices that are configured to and dynamically shared by multiple logical partitions.

Figure 2:
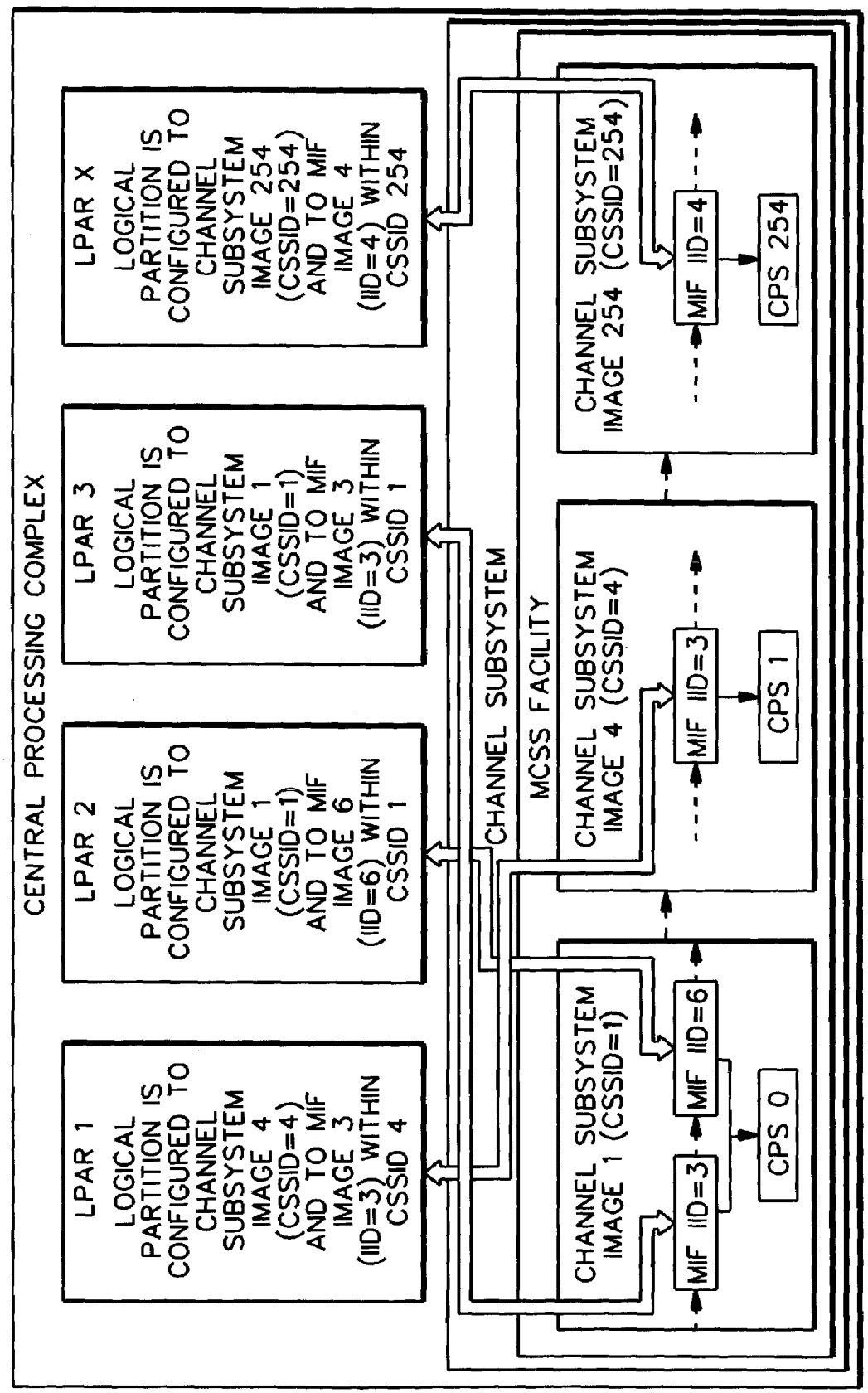
FIG. 2 depicts one embodiment of a plurality of logical partitions coupled to a plurality of channel subsystem images, in accordance with an aspect of the present invention.

As one example, each logical partition is configured to a different MIF image (see FIG. 2) in order to provide the logical partition with an independent set of controls for channel paths, control units and devices that are shared by other logical partitions. Various details regarding the multiple image facility are described in Brice, Jr. et al., U.S. Pat. No. 5,414,851, entitled "Method And Means For Sharing I/O Resources By A Plurality Of Operating Systems," issued on May 9, 1995, which is hereby incorporated herein by reference in its entirety.

Figure 1D:
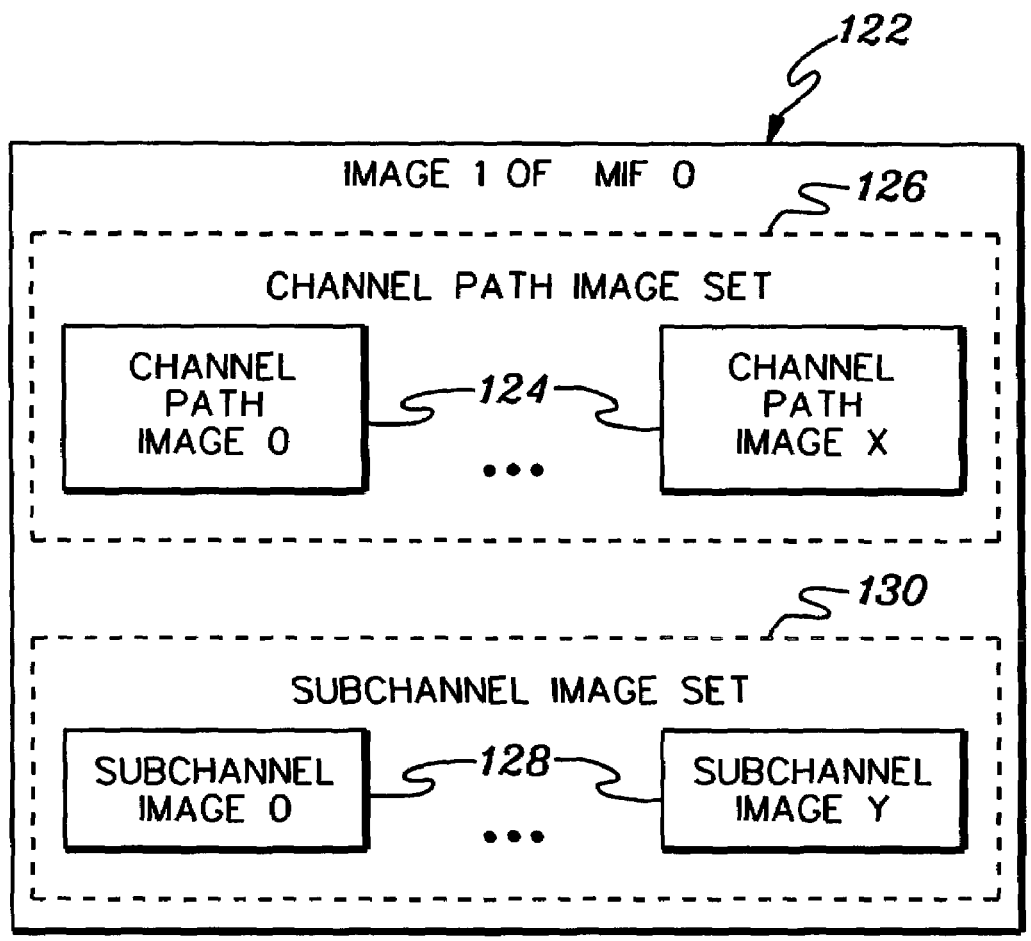
FIG. 1d depicts further details of a Multiple Image Facility (MIF) image of a channel subsystem image of FIG. 1c, in accordance with an aspect of the present invention.

As shown in FIG. 1d, for each MIF image, a separate set of channel path controls and a separate set of subchannel controls are provided by the channel subsystem. For each MIF image, each set of channel path controls for each configured channel path is called a channel path image 124. The collection of one or more channel path images associated with the channel paths that are configured to a MIF image is called a channel path image set 126. Further, for each MIF image, a separate subchannel, called a subchannel image 128, is provided for each I/O device or group of devices that is configured to the MIF image. A collection of one or more subchannel images that are configured to a MIF image is called a subchannel image set 130.

Figure 1E:
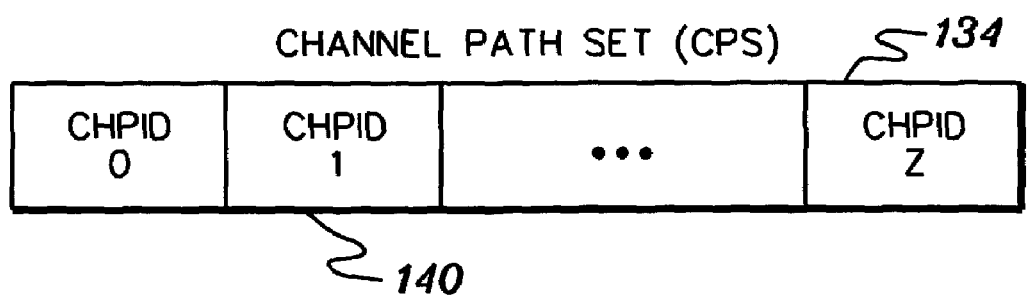
FIG. 1e depicts further details of a channel path set (CPS) of a channel subsystem image of FIG. 1c, in accordance with an aspect of the present invention.

Referring back to FIG. 1c, in addition to a MIF, a channel subsystem image 120 also includes a channel path set (CPS) 134. Channel path set 134 includes, for instance, one to 256 channel paths 140 (FIG. 1e) configured to one or more channel path images in the associated MIF. Each channel path is identified by a channel path identifier (CHPID). Each channel path configured to a channel path set may be unique from other channel paths configured to other provided channel subsystem images. However, because as many as 256 channel subsystem images may be provided, the CHPID values assigned to channel paths in each of the channel path sets may not be unique. Therefore, each channel path is specified by a unique address formed by, for instance, a concatenation of CSSID with the channel path identifier assigned to the channel path. The image ID (IID) further identifies a channel path image for each configured channel path.

A channel path is configured to a physical channel. In accordance with an aspect of the present invention, the same physical channel can be configured to a plurality of channel paths of different channel subsystem images. That is, a channel can be configured to multiple channel subsystem images. Such shared channels are said to span multiple channel subsystem images, and thus, are referred to herein as spanned channels or spanned channel paths. One example of a spanned channel is depicted in FIG. 3.

Figure 3:
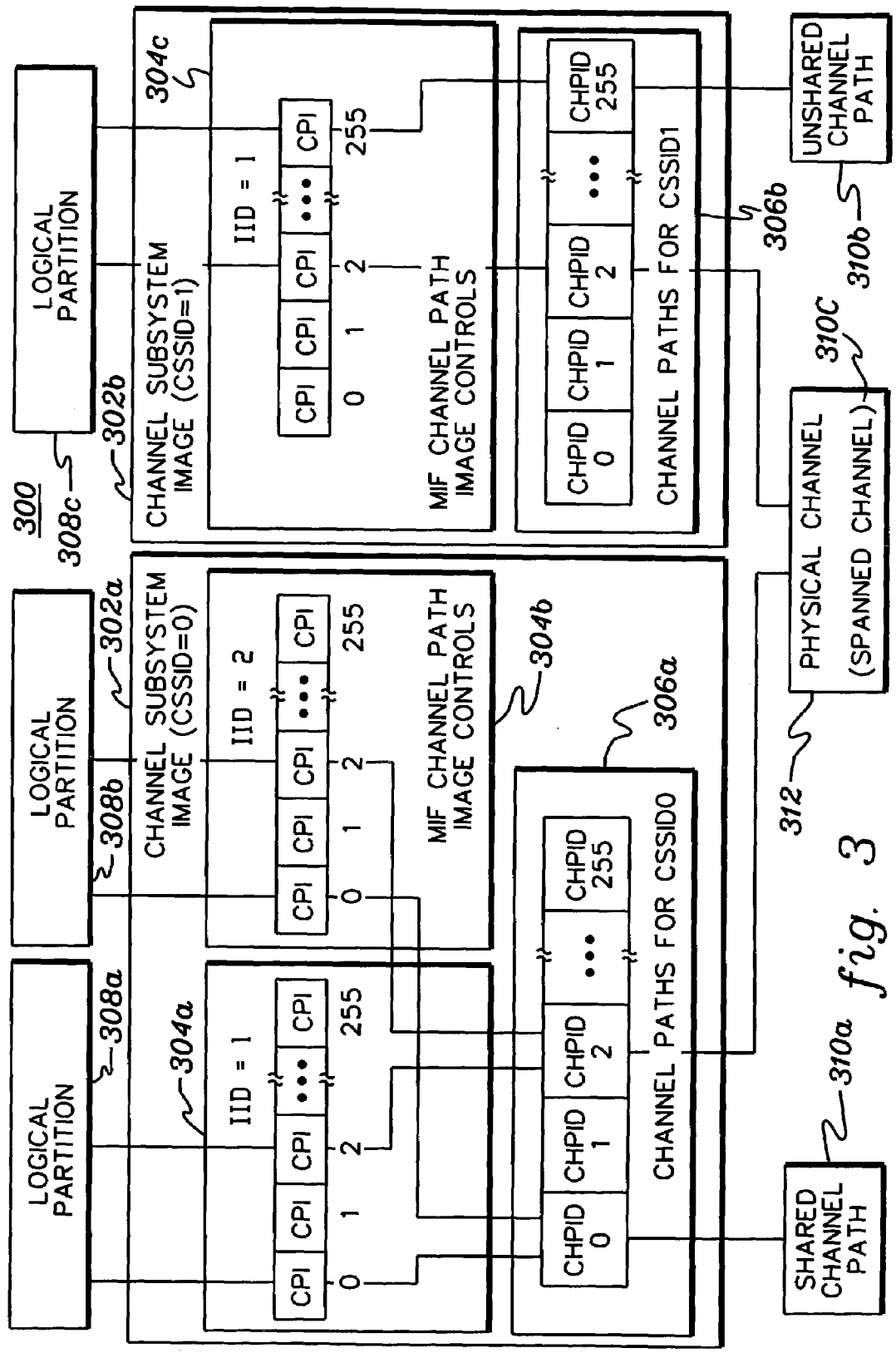
FIG. 3 pictorially depicts one example of a spanned channel, in accordance with an aspect of the present invention.

Referring to FIG. 3, a computing environment 300 includes, in one example, two channel subsystem images 302a, 302b. Channel subsystem image 302a includes, for instance, two MIF images 304a, 304b, while channel subsystem image 302b includes, for instance, one MIF image 304c. MIF images 304a, 304b are coupled to a channel path set 306a, and MIF image 304c is coupled to a channel path set 306b.

In this particular example, logical partitions 308a and 308b, which are coupled to channel subsystem image 302a, are both configured to use CHPID0, and thus, CHPID0 is referred to herein as a shared channel path 310a. CHPID 255, on the other hand, is only configured for use by logical partition 308c, and thus, is considered an unshared channel path 310b. Moreover, since CHPID2 in channel subsystem image 302a and CHPID2 in channel subsystem image 302b are both configured to the same physical channel 312, the physical channel is a spanned channel 310c. The sharing of channels among a plurality of channel subsystem images is described in further detail below.

A channel subsystem has a number of physical channels configured thereto (e.g., 65,536), each identified by a physical channel identifier (PCHID). For example, a physical channel identifier is assigned by the computer system to each possible location that can support a channel card or that can provide I/O or a logical interface. To assign the PCHID values to physical channels, a technique is used that employs the actual physical properties of the machine. For instance, sixteen PCHID values are assigned for each I/O slot because the most dense I/O card, in this example, provides sixteen interfaces. However, the technique is versatile in that new values can be added to the original sixteen per slot, if a more dense I/O card is provided. For each physical channel, there may be one or more logical channel paths associated therewith.

Figure 4A:
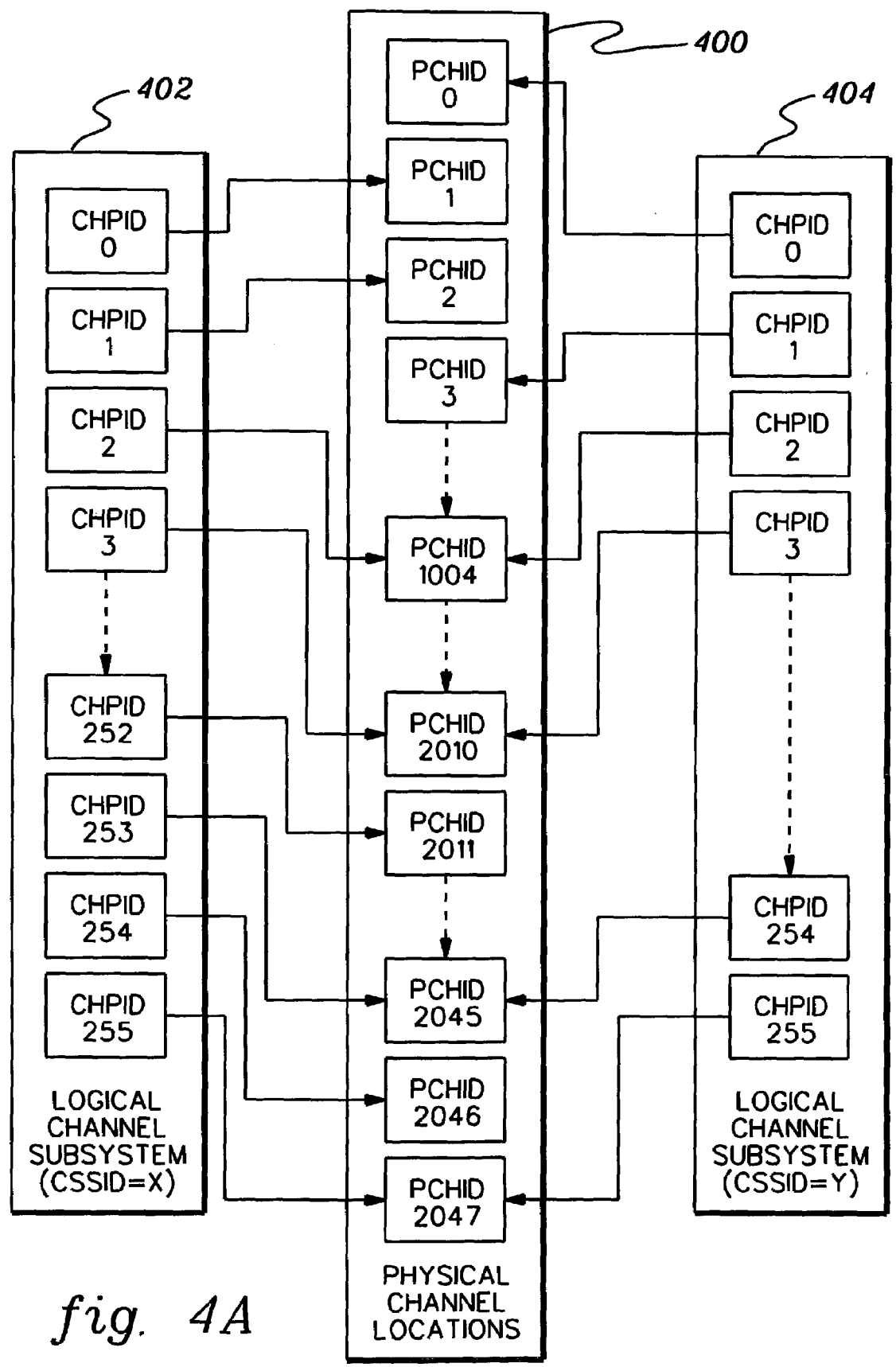
FIG. 4a illustrates one example of the same physical channel being used by two channel subsystem images, as well as different channel subsystem images having the same channel path numbers (CHPIDs) that refer to different physical channels, in accordance with an aspect of the present invention.

For instance, as shown in FIG. 4a, the same physical channel (e.g., PCHID 1004, PCHID 2010, PCHID 2045 or PCHID 2047) is being used by several logical channel subsystems. The center column 400 illustrates an example of a plurality of physical channels in a machine, while the left and right columns 402 and 404, respectively, show different channel subsystem images (a.k.a., logical channel subsystems). It is shown that in the case of a physical channel being used by multiple channel subsystems (i.e., spanning), the same or different logical CHPID numbers refer to the same physical channel. Further, it is shown that different logical channel subsystems may have the same CHPID numbers that refer to different physical channels.

To assign physical channels to channel paths, and thus, channel subsystem images, an I/O configuration is defined. In one example, an I/O configuration is defined using, for instance, a program that translates human generated syntax into binary data that can be used by the machine for configuration, when it is powered on, before there is a program to exploit dynamic I/O interfaces. (Dynamic I/O is another way to define I/O, as described below.) This program is referred to as an I/O configuration program (IOCP). Various details regarding the IOCP are described in "zSeries Input/Output Configuration Program User's Guide for IYP IOCP," IBM Publication No. SB10-7029-03b, Fourth Edition, Level 03b, December 2002, which is hereby incorporated herein by reference in its entirety. The I/O configuration program builds a configuration definition from input data statements and stores the definition in an I/O configuration data set (IOCDS), which is used by the channel subsystem. In one example, the input statements include the following:

1. An ID statement, which is an optional statement that defines a heading data for I/O configuration reports;
2. A RESOURCE statement, which specifies the channel subsystem images (CSS's) and CSSIDs to be configured, and the logical partitions to be defined within each of those channel subsystem images;
3. One or more CHPID statements used to specify channel paths;
4. One or more control unit statements (CNTLUNIT) used to specify one or more control units attached to the channel paths;
5. One or more I/O device statements (IODEVICE) used to specify one or more I/O devices assigned to the control units. In one example, up to 256 I/O devices can be defined in an I/O device statement.

One or more input statements of the IOCP have been enhanced to provide for the assignment of a PCHID to a logical channel subsystem and to a logical CHPID number. For example, the CHPID statement has been enhanced by adding a subkeyword to the PATH keyword of the CHPID statement to allow the assignment of a logical CHPED number to a logical channel subsystem. Further, a new keyword, referred to as PCHID, is added to the CHPID statement, which specifies the PCHID number of the physical channel being defined. As an example, with the following statement: CHPID PATH=(CSS(1),22),PCHID=101, the user has assigned the logical CHPID number of 22 and the Logical Channel Subsystem 1 to the physical channel located at PCHID 101.

As a further example, the CNTLUNIT statement has been enhanced to allow the definition of a single control unit to multiple logical channel subsystems. This is shown in the following statement: CNTLUNIT CUNUMBR=230, PATH=((CSS(1),20),(CSS(2),40)), in which control unit 230 is assigned to be accessed by CHPID 20 in CSS 1 and CHPID 40 in CSS 2.

The IOCP takes these human generated input statements (e.g., CHPID, Control Unit and I/O Device) that represent the actual channels, control units and devices that make up a given I/O configuration and generates a file, referred to as an IOCDS, which is made up of different kinds of data structures for a machine to read when it initializes. Multiple channel subsystem images are represented, and the physical resources are represented in such a way that they have the ability to be either dedicated or spanned shared between channel subsystem images.

There are thousands of physical channels, but there are only 256 CHPIDs, in this example, maintained per channel subsystem image. Thus, a data structure is created, called the PCHID member, to represent the physical channels. This structure includes the relevant physical information about the channel including, for instance: the PCHID number, the one or more CHPID numbers assigned to this PCHID; the channel subsystem image or images for which PCHID is defined to have access; and for some channel types, the switch number to which this channel is connected. Because CHPID numbers may be repeated in each channel subsystem, there is a CHPID data structure for each channel subsystem image. This data structure has an array of 256 entries, each entry indexed by the CHPID number. This structure also includes logical information that can vary based on the channel subsystem image. This information includes, for instance: an indication that this CHPID is defined; a pointer back to the PCHID this CHPID is associated with; and a list of logical partitions that may access this CHPID. The combination of these two structures (i.e., the PCHID member and CHPID member) allows a physical channel to be dedicated or shared between logical partitions, as well as dedicated or spanned between channel subsystem images.

Figure 4B:
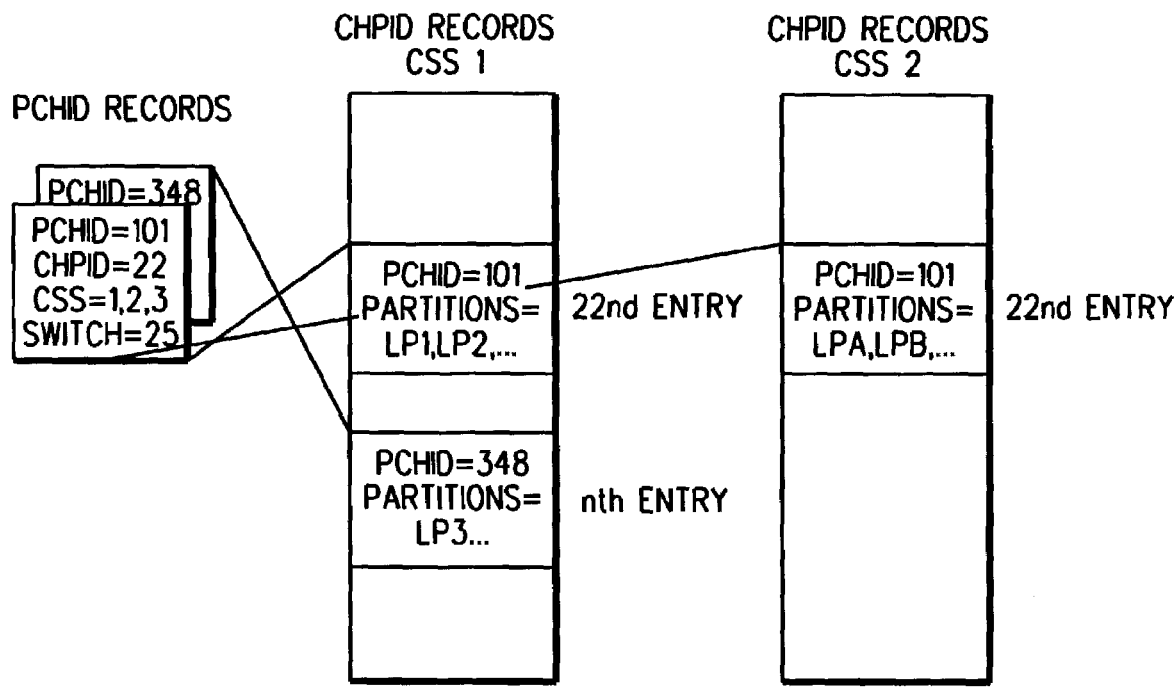
FIG. 4b is an illustration of a CHPID statement generating data structures in an I/O configuration data set (IOCDS), in accordance with an aspect of the present invention.

One example of an illustration of how a typical CHPID statement generates data structures in the IOCDS is shown in FIG. 4b. In this example, it is a spanning CHPID, or a single physical channel that is available to more than one channel subsystem image. The CHPID statement used is, for instance, CHPID PATH=(CSS(1,2,3), 22), PCHID=101, SWITCH=25 . . . . Although three channel subsystem images are referenced, only two are shown in FIG. 4b for clarity. Note that the PCHID entry of physical channel 101 points to the entry of CHPID number 22 in CSS 1, CSS 2 and CSS 3. Also, each CHPID entry points back to the physical information in the PCHID data structure.

In addition to the above, the physical control unit is also represented by a data structure that has been expanded to include connections for multiple channel subsystem images. In one example, the additional fields in the data structure are dependent on the number of channel subsystem images being defined with this configuration. Thus, if one configuration has one channel subsystem, then space for eight CHPIDs and eight Link Addresses are used. But, if another configuration has four channel subsystem images, then space for 32 CHPIDs and 32 Link Addresses is used.

Figure 4C:
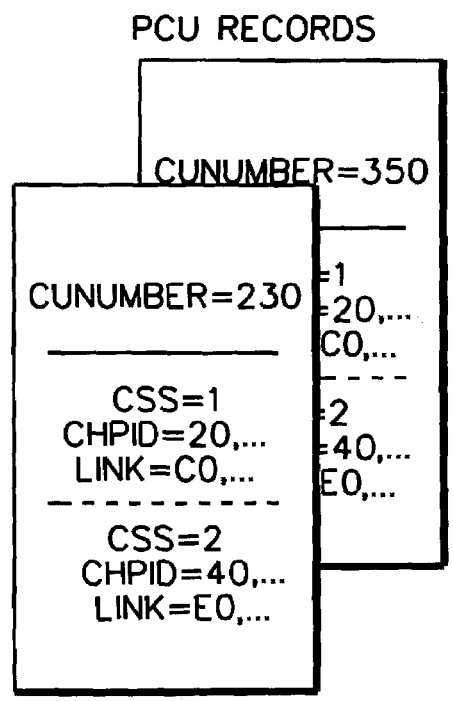
FIG. 4c illustrates the adding of additional information for channel subsystem images to a physical control unit data structure of the IOCDS, in accordance with an aspect of the present invention.

FIG. 4c illustrates one example of how additional information for each CSS is added to the physical control unit data structure. In one example, the control unit input statement is as follows: CNTLUNIT CUN BR=230, PATH= ((CSS(1), 20), (CSS(2), 40)), . . . . Note that the PCU data structure has entries for CSS 1 and CSS 2, but no entry for CSS 3. This is because CSS 3 does not have access to control unit 230.

Yet another resource that is represented in the IOCDS is the I/O device. Each device or group of devices is represented by a data structure called a subchannel. Since each channel subsystem image has its own set of subchannels, the data structures for devices are created on a channel subsystem basis. Thus, a single device that can be accessed from three channel subsystem images has at least three subchannel entries in the IOCDS, one in each of those three channel subsystem images, which allow the device to be independently accessed by the programs configured to each of the channel subsystem images.

Figure 4D:
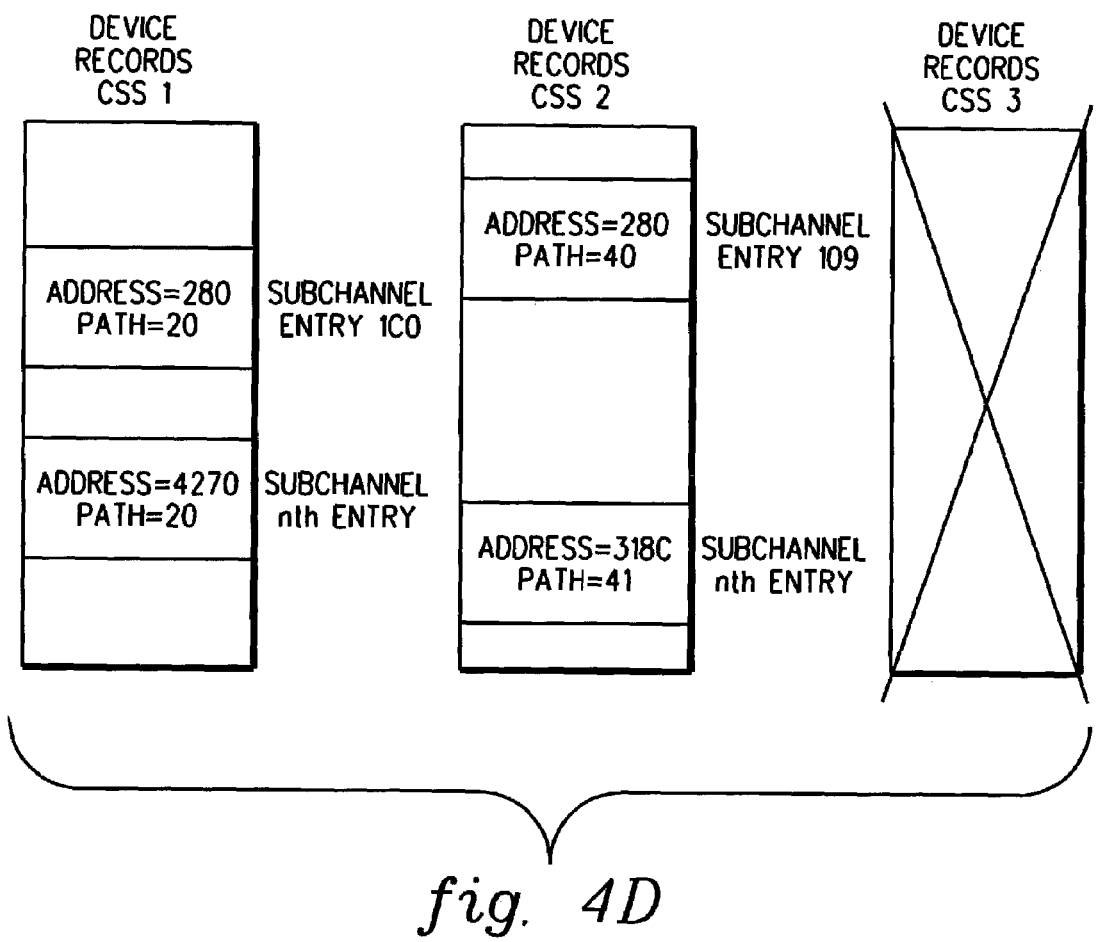
FIG. 4d illustrates that a device that is accessible by multiple channel subsystem images is represented in a subchannel data structure for each channel subsystem image, in accordance with an aspect of the present invention.

FIG. 4d illustrates that a device that is accessible for multiple channel subsystem images is represented in the subchannel data structure for each channel subsystem image, but that the subchannel number (index) can be different for each channel subsystem image. One example of the input statement used for the I/O device is as follows: IODEVICE ADDRESS=280, CUNUMBR=230. . . . This device is defined on a control unit with access to CSS 1 and CSS 2, but not CSS 3. Thus, there are entries in the CSS 1 and CSS 2 data structures, but no entry in the CSS 3 data structure.

Data structures for channel subsystem images not defined in the configuration are not created. This keeps the space used for a given configuration to a minimum.

The I/O configuration definition process is performed for each I/O resource (e.g., channels, control units and/or devices) within a channel subsystem and that collection of input definitions is called Channel Subsystem X (a.k.a., Channel Subsystem Image X). Then, if the customer wants multiple channel subsystem images, the customer would repeat the process one or more times for a collection of I/O resources and each collection is called a new channel subsystem or channel subsystem image.

The LPAR hypervisor (or the I/O configuration process) then assigns one or more channel subsystem images to each configured logical partition. In order to assign channel subsystem images to logical partitions, a Start Interpretive Execution (SIE) state description is used by the hypervisor to configure channel subsystem resources to each of the logical processors associated with each logical partition. In one example, the LPAR hypervisor assigns a default channel subsystem image to each configured logical partition. As one example, the assignment is performed via the RESOURCE statement of IOCP.

The concept of assigning a logical CHPID and CSS to a physical channel allows for the definition of several hundred or thousands of physical channels to a maximum of, for instance, 256 logical CHPIDs in several logical channel subsystems. This avoids system changes that would otherwise force the operating system to support greater than 256 CHPIDs and allows machines to be built with several hundred or even thousands of physical channels.

In accordance with an aspect of the present invention, a physical channel may be configured to any subset of the provided channel subsystem images. For example, each channel may be configured to the maximum number of MIF images (e.g., 15) in each MIF associated with each channel subsystem image. Thus, spanned channels may be shared by each of the logical partitions assigned by the LPAR hypervisor to the MIF images that are configured to different channel subsystem images. In this case of spanning, all 256 logical channel subsystem images contain only spanning channels, thus reducing the maximum count of physical channel paths in a CPC back to 256. For example, if CHPID 2 in channel subsystem image 0 is spanning to CHPID 2 in channel subsystem image 1 and onward to CHPID 2 in CSS 255, then these 256 CHPIDs all share a single physical channel. The opposite end of the spanning spectrum is where no channels in any logical channel subsystem images span, thus maximizing the theoretical physical channel path count of 65,536 and minimizing the overall sharing by spanning. As a further example, spanning can be anywhere in between the two opposite ends of the spectrum. For instance, a spanned channel might be configured to the maximum of 15 MIF images in one channel subsystem image, 4 MIF images in a second channel subsystem image, and 10 MIF images in a third channel subsystem image. Such a configuration would allow the spanned channel to be shared by as many as 29 logical partitions assigned to each of the 29 MIF images. Many other variations are also possible.

Figure 5:
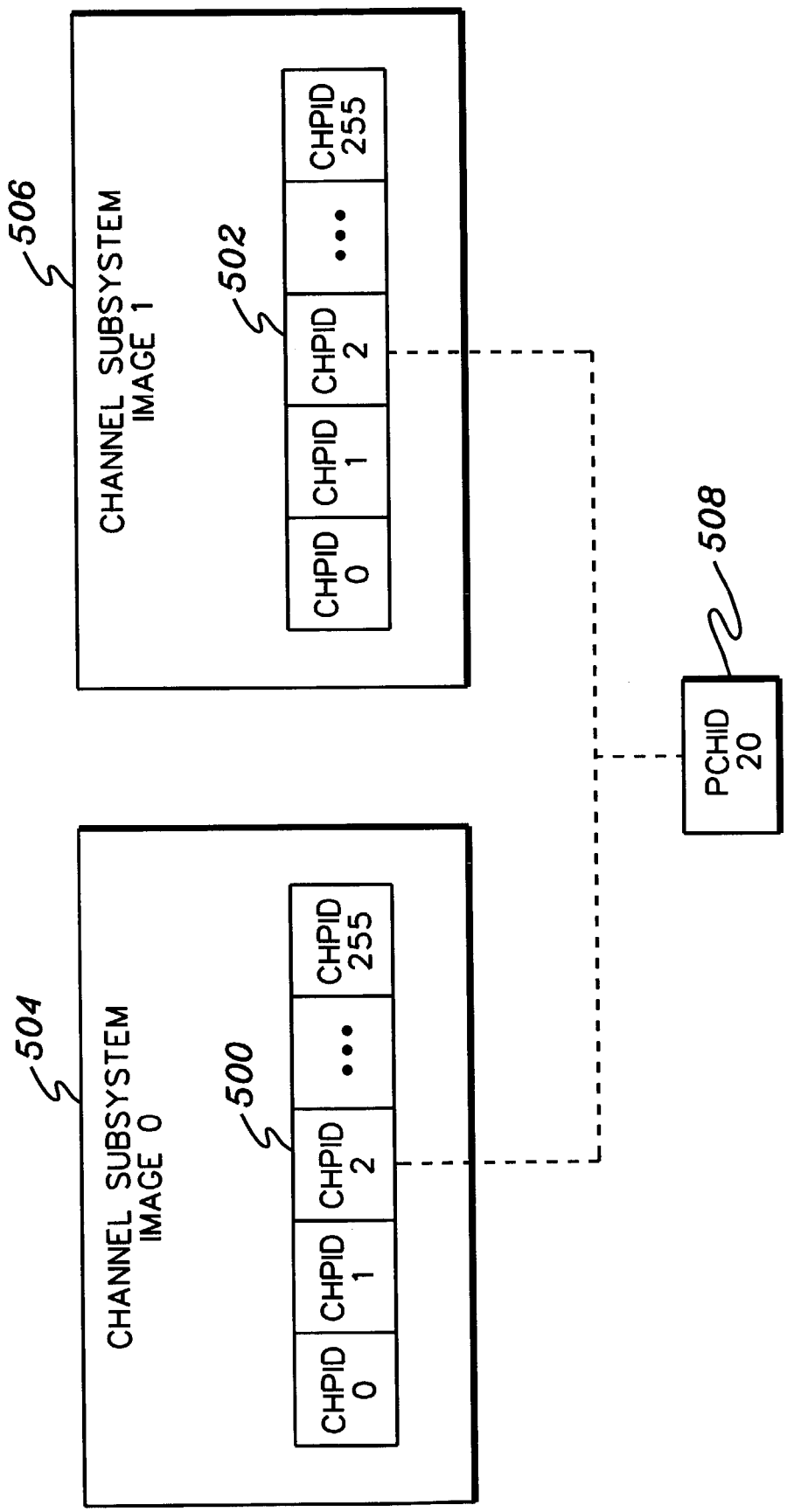
FIG. 5 depicts one example of a spanning group, in which a physical channel is configured to channel paths of different channel subsystem images, in accordance with an aspect of the present invention.

As described above, spanning includes the assigning of a physical channel to a plurality of channel subsystem images. For example, as shown in FIG. 5, a channel path 500 of Channel Subsystem Image 0 504 and a channel path 502 of Channel Subsystem Image 1 506 are configured to the same physical channel 508, and thus, share that channel. Thus, in this example, CHPID 2 in each channel subsystem image assigned to PCHID 20 represents a spanning group. There may be zero or more spanning groups in an environment. Multiple spanning groups of spanning channels, with sharing provided within each group, may or may not be required to use the same CHPID value within each channel subsystem image of a particular group, and are not required to, but may use the same CHPID value in each spanning group across multiple spanning groups. The rules for spanning relationships among channel subsystem images, CHPIDs and physical channel paths are, for example, as follows:

1) A CHPID in a channel subsystem image can be associated with only one PCHID.
2) A channel subsystem image can be associated with 1 to 256 PCHIDs, which also means that the channel subsystem image has from 1 to 256 channel paths, thus preserving rule number 1.
3) A PCHID can be associated with 1 to 256 channel subsystem images, one CHPID per channel subsystem image, again preserving rule number 1.

In one embodiment, a channel path in a logical channel subsystem image can be associated with only one spanning group because the channel path can be associated with only a single physical channel path (PCHID). A given PCHID value uniquely determines a spanning group and so forces multiple spanning groups to be mutually exclusive subsets of provided channel subsystem images.

It is possible that by spanning multiple PCHIDs, more complex configurations can be established. For example, given logical channel subsystem images A, B and C: A and B can span PCHID=1; B and C can span PCHID=2; and A and C can span PCHID=3. There are three PCHIDs, and therefore, three spanning groups (A–B; B–C; and A–C). However, in channel subsystem image A, if CHPID X corresponds to PCHID=1, then CHPID X does not correspond to any other PCHID, and so does not overlap with any other spanning group. In logical channel subsystem A, if CHPID Y corresponds to PCHID=3, then by virtue of this, logical channel subsystem A can also participate in spanning group A–C, as well as its other A–B spanning group. This is because logical channel subsystem image A has two different channel paths and each channel path is associated with a different physical channel path.

Management of an I/O configuration definition with multiple logical channel subsystems is, in one example, accomplished from a single, authorized logical partition. Thus, at least one program in an arbitrarily specified logical partition has an awareness of the overall MCSS extensions; however, other programs are protected from being impacted by the new capabilities. This enhanced management capability does not place additional operational requirements on programs in other logical partitions, nor even on other programs in the same logical partition. Thus, the management extensions employed to support a central processing complex that has MCSS and spanning can be localized to a single program in a single logical partition; no other programs need be made aware of MCSS.

In one example, the management is performed by a manager, which is a program that is authorized to perform the commands that provide the management functions. The commands used by the manager include Channel Subsystem Call (CHSC) commands, which have a subset of commands also known as dynamic I/O (DIO) commands. The DIO commands have the ability to change the active I/O configuration definition without requiring a restart of the CPC or channel subsystem (e.g., re-IML or a re-IPL) to make the change become effective.

A CHSC command that is extended for spanning is described below. An example of this CHSC command, without the extensions, is described in Cwiakala et al., U.S. Pat. No. 5,170,472, entitled "Dynamically Changing A System I/O Configuration Definition," issued Dec. 8, 1992, which is hereby incorporated herein by reference in its entirety. In one example, the dynamic I/O command that is enhanced includes, for instance, a Change Channel Path Configuration command.

The Change Channel Path Configuration command is used to add, modify or delete the description of a channel path in the I/O configuration definition. As one example, the add operation of the CCPC CHSC command is extended to associate the channel path (CHPID) being added to the specified channel subsystem image with a specified physical channel (PCHID) in the CPC. If the physical channel does not have the capability of being shared, then a single association of CSS.CHPID-to-PCHID fully occupies the physical channel path. If the physical channel path does have the capability of being shared, then a plurality of associations of <css>.CHPID-to-PCHID are possible. This is limited by using the maximum architectural number of channel subsystem images (e.g., 256), by the maximum number of shareholders provided by the specified physical channel path, or by the model dependent number of channel subsystem images provided in a particular model of CPC.

The Change Channel Path Configuration command can be executed asynchronously and is not interpretively executed. Specification of the operation to be performed and the information used to change the I/O configuration definition that is used by the channel subsystem to control I/O or message operations are provided in a command request block.

Figure 6A:
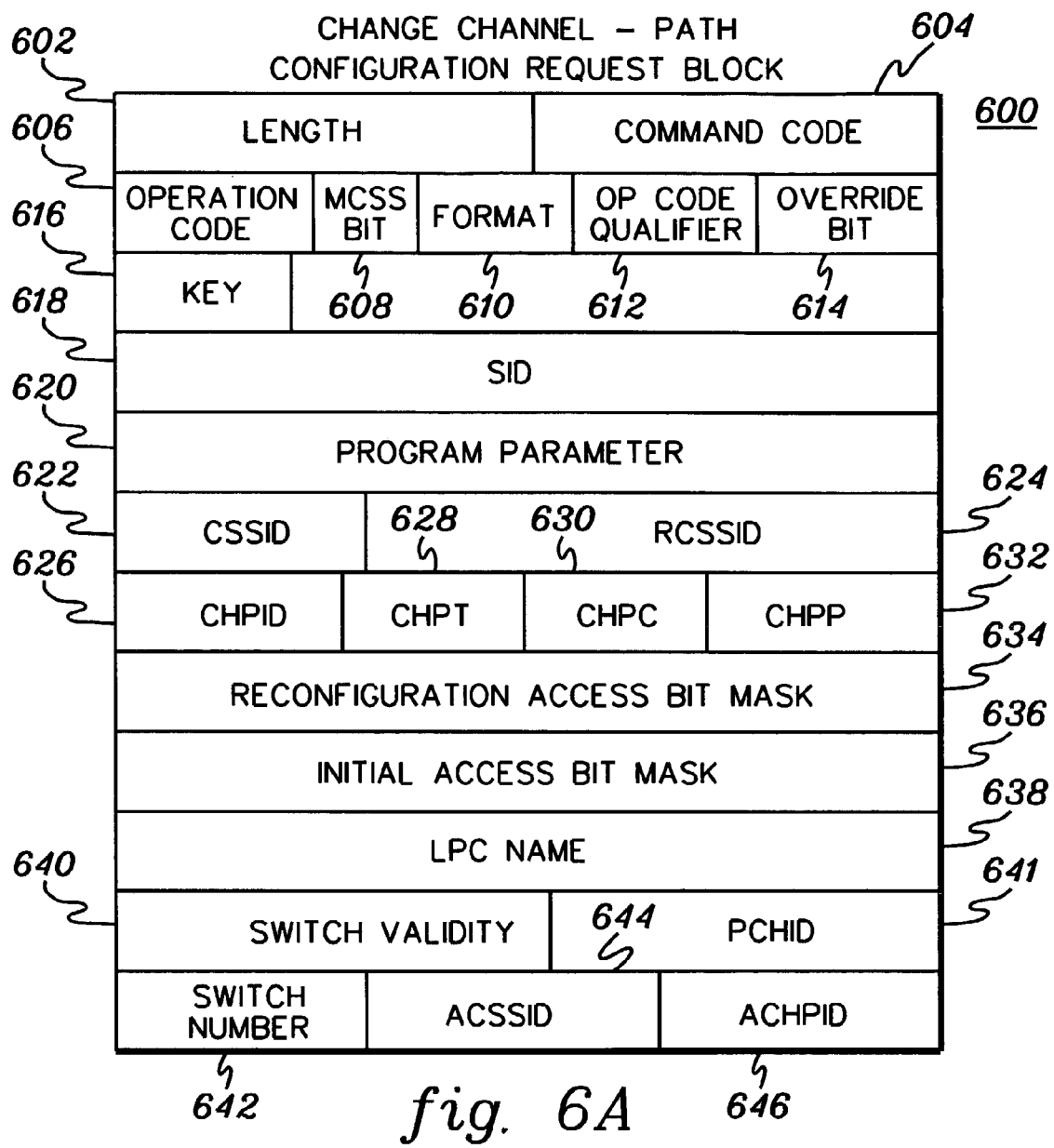
FIG. 6a depicts one embodiment of a request block for a change channel path configuration command, in accordance with an aspect of the present invention.

One example of a command request block for a Change Channel Path Configuration command is described with reference to FIG. 6a. In one example, the change channel path configuration request block 600 includes the following fields:

(a) Length Field 602: This field indicates the length of this request block;

(b) Command Code 604: This field specifies the change channel path configuration command;

(c) Operation Code 606: The operation code indicates the type of channel path configuration operation that is to be performed. The fields of the request data area of the command request block that are used are dependent upon the operation to be performed. The contents of the request data area fields that are not specified as being examined for possible use in performing the requested operation are ignored. Examples of various operation codes are as follows:

0 Add the description of the specified channel path to the I/O configuration definition. When the MCSS facility is provided by the CPC, the location of the physical channel path designated by the PCHID field is specified for an add operation. When the channel path type field (CHPT), described below, specifies an internal channel path type, the PCHID field is ignored. The PCHID field is not examined for any other operation.

All of the fields except RCSSID are examined for use in performing the add operation.

Upon exit from configuration mode, given that this change remains intact, an I/O-resource-accessibility-information event is made pending for the MIF image affected by this operation, and thus, the affected channel subsystem and corresponding logical partition, to signal the added accessibility of the specified channel path.

1 Modify the description of the specified channel path in the I/O configuration definition. The type of modification is specified by the operation code qualifier (OCQ). This operation code is specified when the CPC is operating in LPAR mode.

The CHPID, OCQ, and CSSID fields are examined for use in performing a modify operation. Additional fields may be specified depending on the contents of the OCQ field. The fields that are used are identified in the description of the OCQ values.

2 Delete the description of the specified channel path from the I/O configuration definition.

The CHPID and CSSID fields are examined for use in performing the delete operation.

When the multiple channel subsystem facility is provided by the CPC, the delete operation is used to delete the last channel path from a channel subsystem image provided that the channel path is not present in any other channel subsystem image.

Successful add, modify, and delete operations cause the I/O-configuration-changed condition to be set in the channel subsystem. Successful add, modify, and delete operations cause the channel subsystem to retain the specified program parameter, replacing the current program parameter, if any, in the channel subsystem.

(d) Multiple Channel subsystem Bit (M) 608: When the multiple channel subsystem facility is provided by the CPC, and the M bit is one, the CSSID field is checked for a valid CSSID. If valid, the value in the CSSID field becomes the effective CSSID. If not valid, then a response code may be stored. When M is zero, the default CSSID is the effective CSSID, and the CSSID field is zero; otherwise a response code may be stored.

(e) Format (FMT) 610: The command request format field includes an unsigned integer whose value specifies the layout of the command request block. In one example, this value is 0.

(f) Operation-Code Qualifier (OCQ) 612: This field includes a value that qualifies the operation specified by the OC field. The meaning of each value of the OCQ field is, for instance, as follows:

0 No qualification: The operation specified by the OC field is not qualified by the OCQ field. When the CPC is operating in LPAR mode, the OC field is qualified by the OCQ.

1 Unshared reconfigurable: The specified channel path is added to the I/O configuration definition as an unshared channel path. The channel path can be configured to one MIF image within a channel subsystem image at a time. The channel path can be reconfigured to any other MIF image of the channel subsystem image for which reconfiguration access has been established.

The channel path can be configured to any one of the MIF images provided in the I/O configuration definition that are specified in the reconfiguration-access bit mask.

One MIF image of the channel subsystem image is defined to have initial access to the channel path, when the MIF image is subsequently activated. The MIF image for which initial access is to be established is specified by the initial-access bit mask.

On some models, the OCQ value is not specified when the channel path type field indicates an internal system device channel.

This OCQ value may be specified when the OC field specifies an add operation (OC=0) and the CPC is operating in LPAR mode.

When an add operation that specifies this operation-code qualifier adds a channel path, the channel path cannot subsequently be spanned, in this example, even if it otherwise might have been had it been added using the shared (OCQ=3) operation-code qualifier.

2 Unshared non-reconfigurable: The specified channel path is added to the I/O configuration definition as an unshared channel path. The channel path is configured to one MIF image of the channel subsystem image and can be subsequently deconfigured or configured to that MIF image. The channel path cannot be subsequently reconfigured to other MIF images, in one embodiment. The single MIF image to which the channel path can be configured is specified in the reconfiguration access bit mask. The same MIF image may also be given access to the channel path, when the logical partition associated with the MIF image is activated.

The initial access bit mask is used to specify the same MIF image as the reconfiguration access bit mask, when initial access to the channel path is to be established.

This OCQ value may be specified, when the OC field specifies an add operation and the CPC is operating in LPAR mode.

When an add operation (OC=0) that specifies this operation-code qualifier adds a channel path, the channel path cannot subsequently be spanned, in this example, even if it otherwise might have been had it been added using the shared (OCQ=3) operation-code qualifier.

3 Shared: The channel path is added as a shared channel path provided that the CHPT field specifies an allowed channel type, such as, for instance, a serial channel, cluster bus peer channel, an emulated I/O channel, a fibre-channel channel, as just some examples.

The channel path can be concurrently configured to multiple MIF images (as specified in the reconfiguration access bit mask) and used to concurrently execute I/O operations or message operations for all configured MIF images.

One channel path image is added to the I/O configuration definition for each MIF image specified in the reconfiguration access bit mask.

The channel path is initially configured to each MIF image specified in the initial access bit mask, when a logical partition that is associated with the MIF image is activated.

This OCQ value may be specified when the OC field specifies an add operation and the CPC is operating in LPAR mode.

4 Add access: The I/O configuration definition is modified by adding one or more MIF images to the current set of MIF images that can be used to access the specified channel path. The specified channel path and MIF images are to be currently defined in the I/O configuration definition of the specified channel subsystem image. MIF images can be added to the set of MIF images to which the channel path may be subsequently reconfigured. Reconfiguration access may be added for both unshared reconfigurable channel paths and for shared channel paths.

The reconfiguration access bit mask specifies the MIF images of the specified channel subsystem image for which reconfiguration access is to be added.

For each MIF image in the modified set of MIF images that has reconfiguration access, the channel path may subsequently be configured as follows:

Unshared Image Reconfigurable Channel Path: The channel path can be configured to any one MIF image in the modified reconfiguration-access set of MIF images at a time.

Shared Channel Path: The channel path may be concurrently configured to any of the MIF images in the modified reconfiguration-access set.

The OCQ value may be specified when the CPC is operating in LPAR mode and the OC field specifies the modify operation.

The OCQ, CHPID, RABM, and CSSID fields are examined for use in performing this type of operation.

Upon exit from configuration mode, given that this change remains intact, an I/O resource accessibility information event is made pending for the MIF image affected by this operation, and thus, the affected channel subsystem image and corresponding logical partition, to signal the added accessibility of the specified channel path.

5 Unconditional delete access: The I/O configuration definition is modified by deleting one or more MIF images from the current set of MIF images of the specified channel subsystem image that can be used to access the specified channel path. The specified channel path and MIF images are to be currently defined in the I/O configuration definition. Reconfiguration access may be deleted for both unshared reconfigurable channel paths and for shared channel paths.

The reconfiguration access bit mask specifies the MIF images of the channel subsystem image for which reconfiguration access is to be deleted.

For each MIF image deleted from the set of MIF images that has reconfiguration access to the channel path, the channel path is deconfigured, if the MIF image currently has access to the channel path and cannot be subsequently configured to that MIF image.

When the specified channel path is a shared channel path, the corresponding channel path images are deleted. The channel path definition is not deleted from the current I/O configuration definition for either a shared or unshared channel path even when all MIF images have been deleted from the set of MIF-images that have reconfiguration access to the channel path.

This OCQ value may be specified when the CPC is operating in LPAR mode and the OC field specifies the modify operation.

The OCQ, CHPID, RABM and CSSID fields are examined for use in performing this type of operation.

6 Conditional delete access (Conditional): The I/O configuration definition is modified by deleting one or more MIF images from the current set of MIF images of the specified channel subsystem image that can be used to access the specified channel path, when none of the specified MIF images are currently configured to the channel path.

When none of the specified MIF images are configured to the specified channel path, reconfiguration access to the specified channel path for the specified MIF images is deleted just as when OCQ 5 is specified.

When one or more of the specified MIF images are configured to the specified channel path, reconfiguration access for the specified channel path is not modified. A response code and response code qualifier are stored in the command response block indicating that the requested change was not made.

The command request block specification conditions and requirements that are described for OCQ 5 apply equally to this OCQ value.

The OCQ value may be specified when the CPC is operating in LPAR mode and the OC field specifies the modify operation.

7 Add-CSS-image access: When the multiple channel subsystem facility is provided by the CPC, the I/O configuration definition is modified by adding a channel path to the target CSS image where the latter is specified by the CSSID. The object channel path being added by this operation is a shared channel path. The CHPID value assigned to the object channel path is the same as the CHPID value of the referenced channel path specified by RCSSID.CHPID, in this example. The characteristics of the object channel path are determined from the referenced channel path. These characteristic include, for instance, the following:

The channel-path type is to be a type that is supported as a spanned channel path by the CPC model.

The referenced channel path is to be located in a channel subsystem image other than the target channel subsystem image.

The referenced channel path identified by RCSSID.CHPID is to be already described in the I/O-configuration definition for the channel subsystem image.

The referenced channel path identified by RCSSID.CHPID is not a managed channel path.

The characteristics of the referenced channel path are inherited, except the reconfiguration access and initial access bit masks, which are determined from the command for a given target channel subsystem image.

The CHPID, CSSID, RABM, IABM and RCSSID fields are examined for use in performing this type of modify operation.

Upon exit from configuration mode, given that this change remains intact, an I/O-resource-accessibility-information event is made pending for the MIF image affected by this operation, and thus, the affected channel subsystem image and corresponding logical partition, to signal the added accessibility of the specified channel path.

8 Delete-CSS-image access: When the multiple channel subsystem facility is provided by the CPC, the I/O configuration definition is modified by deleting a channel path from the target channel subsystem image, where the latter is specified by the CSSID. The object channel path being deleted by this operation is not to be only available to one channel subsystem image.

The CHPID and CSSID are examined for use in performing this type of modify operation.

This OCQ value may be specified when the CPC is operating in LPAR mode and the OC field specifies the modify operation.

(g) Override Bit (O) 614: The override bit allows the program to request a configuration change of an unusual nature that would normally be disallowed by the channel subsystem. The channel subsystem may nevertheless disallow the override request.

(h) Key 616: This field includes the storage-access key used by the channel subsystem to access the command request block and the command response block for asynchronous operations that are initiated by the command.

(i) Subsystem-Identification (SID) 618: This field specifies the CHSC subchannel that is used to perform operations that are asynchronous to CHSC execution.

(j) Program Parameter 620: This field includes a value that the program associates with this change channel path configuration command.

(k) Channel Subsystem Image ID (CSSID) 622: When the multiple channel subsystem facility is provided by the CPC, this field indicates the CSSID of the target channel subsystem image with which the designated channel path specified in the CHPID field will be associated. The CSSID value is subject to range and existence checking.

(l) Reference Channel Subsystem Image ID (RCSSID) 624: When the multiple channel subsystem facility is provided by the CPC, this field includes the reference CSSID of a channel subsystem image from which the channel-path characteristics are copied for an add-CSS-image access modify operation (OCQ=7). The RCSSID value is subject to range and existence checking.

(m) Channel-Path Identifier (CHPID) 626: This field specifies the CHPID of the channel path that is the object of the change channel path configuration command.

(n) Channel-Path Type (CHPT) 628: This field specifies the type of the specified channel path.

(o) Channel-Path Characteristics (CHPC) 630: This field specifies characteristics of the specified channel path. When one, the meaning of bits 0–7 is as follows, in one example:

| Bits | Meaning |
|---|---|
| 0 | CTCA: Providing that the CHPT field specifies a serial-I/O channel path, the specified channel path can be used to provide access to a channel-to-channel adapter in the CPC that contains the specified channel path. |
| 1 | When the dynamic-CHPID management facility is provided by the CPC or the channel path identified in the CHPID field is an internal-queued-direct-communication channel (as indicated by the contents of the CHPT field), the OC field specifies the add operation, and this bit is one, the CHPP field includes a parameter that is associated with the specified CHPID.<br>When the dynamic-CHPID management facility is provided by the CPC or when the channel identified in the CHPID field is an internal-queued-direct-communication channel (as indicated by the contents of the CHPT field), and the OC field specifies the modify or delete operation, this bit and the contents of the CHPP and LPC name fields are ignored.<br>When the dynamic-CHPID-management facility is not provided by the CPC and when the channel identified in the CHPID field is not an internal-queued-direct-communication channel (as indicated by the contents of the CHPT field), this bit is reserved and set to zero. |
| 2 | When the channel path identified in the CHPID field is an internal coupling peer channel (as indicated by the contents of the CHPT field), the OC field specifies the add operation, and this bit is one, the channel path identified in the ACSSID.ACHPID field (another internal-coupling-peer channel) is to be associated with the channel path identified in the CHPID field.<br>When the channel path identified in the CHPID field is an internal coupling peer channel (as indicated by the contents of the CHPT field), the OC field specifies the add operation, and this bit is zero, no channel path is to be associated with the channel path identified in the CHPID field and the content of the ACHPID and ACSSID fields are ignored.<br>When the channel path identified in the CHPID field is an internal coupling peer channel (as indicated by the contents of the CHPT field), and the OC field specifies the modify or delete operation, this bit of the CHPC field and the content of the ACHPID and ACSSID fields are ignored.<br>When the channel path identified in the CHPID field is other than an internal coupling peer channel (as indicated by the contents of the CHPT field), this bit, the ACHPID and ACSSID fields are reserved and set to zeros. |

When the channel identified in the CHPID field is an internal-queued-direct-communication channel (as indicated by the contents of the CHPT field), bits 0–1, as one example, include a value that specifies the maximum frame size (MFS) to be used by the internal-queued-direct-communication channel.

Bits 2–7, as examples, also specify a parameter that the program associates with the channel path identified in the CHPID field. The contents of these bits have meaning to the program, except that when bit 7 of the CHPP field is one, it means that:

the specified CHPID is a managed CHPID,
when the CPC is operating in LPAR mode, a logical-partition-cluster name is provided,
when the CPC is operating in LPAR mode, the OCQ field includes the value 3, indicating that the specified CHPID is shared, and
a defined bit of the SWTV field is one, indicating that a switch is attached to the specified CHPID.

(q) Reconfiguration-Access Bit Mask (RABM) 634: This bit mask is used to indicate which MIF images are to be added or deleted from the set of MIF-images that have reconfiguration access to the specified channel path. For each MIF image that has reconfiguration access to the specified channel path, the channel path can be configured to the MIF image by use of the appropriate reconfiguration commands.

In one example, each bit in the reconfiguration-access bit mask represents a one-to-one correspondence with a MIF image of the channel subsystem image that is specified by the CSSID field.

When the OC field specifies the add operation or the OCQ field specifies add-CSS-image access operation or the add-access operation, a one in a bit position of this mask indicates that the correspondingly numbered MIF image is to be added to the set of MIF-images that have reconfiguration access to the specified channel path. When the correspondingly numbered bit is zero, the MIF image is not to be added to the set of MIF-images that have reconfiguration access to the specified channel path.

When the OC field specifies the modify operation and the OCQ field specifies a conditional delete-access operation, a one in a bit position of this mask indicates that the correspondingly numbered MIF image is to be deleted from the set of MIF-images that have reconfiguration access. The channel path is deconfigured, if the MIF image is not currently configured to the channel path. If the OCQ field specifies an unconditional delete-access operation, a one in a bit position of this mask indicates that the correspondingly number MIF image is to be deleted from the current set of MIF-images that have reconfiguration access. The channel path is deconfigured, if the MIF image currently has access to the channel path. Additionally, if the correspondingly number MIF image is currently in the set of MIF-images that have initial access to the channel path, then initial access for the MIF image is also deleted. When the correspondingly numbered bit is zero, the MIF image is not to be deleted from the set of MIF-images that have reconfiguration access to the specified channel path.

When the OC field specifies an add operation and the OCQ field specifies an unshared not-reconfigurable channel path, only one bit in this mask is set to one.

When the OC field specifies an add operation and the OCQ field specifies either an unshared reconfigurable or shared channel path, any bits that correspond to provided MIF images can be set to one. At least one bit that corresponds to a provided MIF image is to be set to one.

When the OC field specifies a modify operation, this mask is not to contain all zeros.

This bit mask is ignored when any of the following conditions exists: the OC field specifies a delete operation; the CPC is operating in BASIC mode; or the OCQ field specifies a delete-CSS-image access operation.

(r) Initial-Access Bit Mask (IABM) 636: When the CPC is operating in LPAR mode, this bit mask is used to indicate which MIF images are to be placed into the set of MIF images that have initial access to the specified channel path. The initial-access bit mask may specify all zeros.

When the OC field specifies an add operation or add CSS-image access, a one in a bit position of this mask indicates that the correspondingly numbered MIF image is to be added to the set of MIF-images that have initial access to the specified channel path. When the correspondingly numbered bit is zero, the MIF image is not to be added to the set of MIF-images that have initial access to the specified channel path.

When the OC field specifies an add operation and the OCQ field specifies an unshared reconfigurable or an unshared not-reconfigurable channel path, only one bit in this mask may be one and the correspondingly bit in the reconfiguration-access bit mask is also one.

When the OC field specifies an add operation and the OCQ field specifies shared, any bits for provided MIF images within the channel subsystem image may be set to one, when the correspondingly bit in the reconfiguration access bit mask is also set to one.

When the dynamic-CHPID-management facility is provided by the CPC, and the OC field specifies the add operation, bit 1 of the CHPC field is one, and this is a managed CHPID as designated by the CHPP field, the initial access bit mask that corresponds to provided MIF images is set to zero.

For each MIF image that has initial-access to the specified channel path, the channel path is configured to the MIF image, when it is subsequently activated as part of a partition activation process. When the specified MIF image is currently active, the channel path is not configured to the MIF image unless the program operating in the logical partition executes an appropriate SCLP reconfiguration command.

This bit mask is ignored when the OC field specifies a modify, except OCQ=7, or delete operation, or the CPC is operating in BASIC mode.

(s) Logical Partition Cluster (LPC) Name 638: A logical partition cluster is the collection of the logical partitions within a CPC that are associated with the same logical partition cluster name for a given type of logical partition cluster. The program declares a logical partition cluster name for a logical partition by means of a Diagnose instruction.

When the following conditions exist, this field includes the logical partition cluster name of the logical partition cluster with which the specified channel path is to be associated: the dynamic CHPID management facility is provided by the CPC; the CPC is operating in LPAR mode; the OC field specifies the add operation; bit 1 of the CHPC field is one; bit 7 of the CHPP filed is one.

The contents and format of the logical partition cluster name are determined by the program.

(t) Switch Validity (SWTV) 640: When one, this field specifies that the SWTN field contains valid information.

(u) Physical Channel Identifier (PCHID) 641: When the multiple channel subsystem facility is provided by the CPC, this field includes an unsigned integer that represents a model-dependent identification of the physical location of a channel. PCHID is used for an initial add operation, except for the addition of an internal channel, such as an internal-queued-direct-communication channel and internal-coupling-peer channel. The PCHID field is ignored, when the CHPT field indicates any of the internal channel-path types. If a PCHID value is not recognized, a response-code may be stored.

(v) Switch Number (SWTN) 642: When a predefined bit of the SWTV field is one, this field includes a unique identifier of a switch on the specified channel path. When the CHPT field specifies a fibre-channel channel, the switch number (SWTN) designates the entry switch to a fibre-channel fabric.

(w) Associated Channel Subsystem ID (ACSSID) 644: When the multiple channel subsystem facility is provided by the CPC, this field includes the CSSID of a channel subsystem image that is associated with the CHPID of an internal-coupling-peer channel specified by the ACHPID field. The ACSSID is subject to range and existence checking.

(x) Associated Channel Path (ACHPID) 646: When the channel identified in the CHPID field is an internal-coupling-peer channel (as indicated by the contents of the CHPT field), the OC field specifies the add operation, conditions allow the addition, and bit 2 of the CHPC field is one, this field includes the CHPID of an internal-coupling-peer channel with which the channel specified in the CHPID field is to be associated.

When two internal-coupling-peer channels are associated in this way, it means that messages that are sent on either one of the channels are received on the other associated channel.

When the channel identified in the CHPID field is an internal-coupling-peer channel, the OC field specifies the delete operation, and conditions allow the deletion, the specified channel is deleted from the I/O-configuration definition. If another internal-coupling-peer channel is associated with the specified channel, when the specified channel is deleted, the status of the associated channel is affected as follows: If the associated channel path is configured to one or more MIF images, the associated channel path is deconfigured from those MIF images; the associated channel path enters a state where it is no longer associated with an internal coupling-peer-channel.

The ACSSID and ACHPID fields, taken together, reference a channel path in a channel subsystem image that may itself be a spanned channel path (call this spanning group A). When such is the case, the ACSSID field may specify any of the CSSIDs that have the channel path specified by the ACHPID field defined. After the add of the channel path that references spanning group A, the following requests are supported:

A modify add CSS-image-access operation may be requested that specifies RCSSID as the previous ACSSID value, and CHPID as the previous ACHPID value, thus increasing the number of channel subsystem images where the ACHPID is spanned (i.e., increasing the size of spanning group A).

A modify add-CSS-image-access operation may be requested that specifies RCSSID as the previous CSSID value, and CHPID as the previous CHPID value, thus increasing the number of channel subsystem images where the CHPID is spanned (call this spanning group C).

Spanning group C is not established until after the linkage is established between the first channel path of spanning group C and the channel path of one of the channel subsystem images of spanning group A.

The connectivity between spanning group C and A is any-to-any. This connectivity remains intact as long as each spanning group has at least one channel path defined.

Figure 6B:
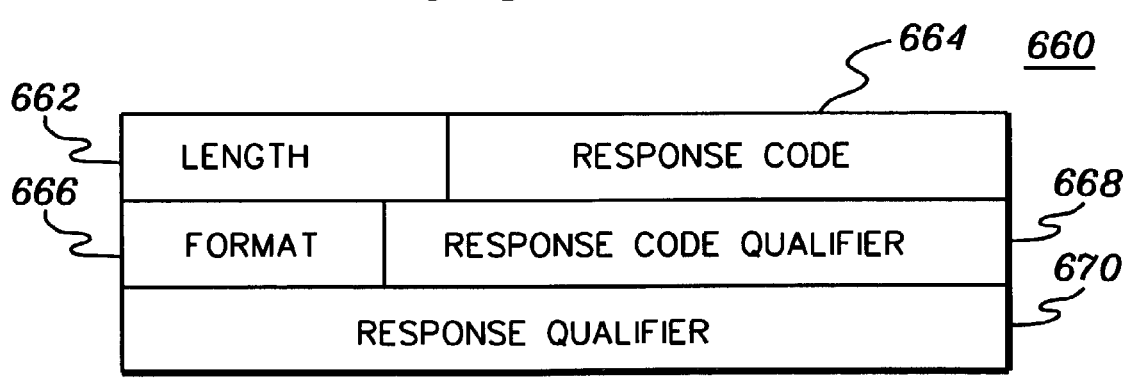
FIG. 6b depicts one embodiment of a response block for the change channel path configuration command, in accordance with an aspect of the present invention.

One embodiment of a command response block for the Change Channel Path Configuration command is described with reference to FIG. 6b. In one example, a command response block 660 includes the following fields:

(a) Length Field 662: This field specifies the length of the command response block. The length depends on the response code that is stored as a result of the attempt to execute the change channel path configuration command.

(b) Response Code 664: This field includes an unsigned binary integer that describes the results of the attempt to execute the change channel path configuration command. When the response code field indicates an unsuccessful attempt, no change is made to the I/O configuration definition, the I/O configuration changed condition in the channel subsystem is not affected, and the contents of the program parameter field are ignored.

When execution of the change channel path configuration command results in a predefined condition code being set, the channel subsystem has been given the initiative to asynchronously attempt to perform the requested change to the I/O configuration definition. The completion of that attempt is indicated by means of a CHSC subchannel I/O interruption with the results of the attempt specified by the response code in the command response block.

(c) Format (FMT) 666: The command response format field includes an unsigned integer whose value specifies the layout of the command response block.

(d) Response Code Qualifier (RCQ) 668: When a response code other than a code indicating success is stored in the response code field, this field includes either an architected value or a model dependent value that further describes the condition specified by the response code.

(e) Response Qualifier (RQ) 670: When the response code field indicates that the requested configuration change has occurred, the response qualifier field includes a value that provides information about conditions associated with that change. The meaning of each value is, for example, as follows:

0 There are no special conditions associated with the configuration change.

1 The information provided by the program for the configuration change does not match the physical configuration. This value may occur when the associated command request specifies an add (OC=0) operation.

2 The specified physical channel path (PCHID) is not installed. This value may occur when the associated command request specifies an add (OC=0) operation.

When the CPC is operating in LPAR mode, there are three cases when the execution of the change channel path configuration command can include an attempt to deconfigure a channel path from one or more MIF images.

1. The delete operation is requested, or delete-CSS-image access (OCQ=8) is specified, conditions allow the specified channel to be deleted, and the specified channel path is configured to one or more MIF images within a channel subsystem image. The machine attempts to deconfigure the specified channel path from those MIF images.

2. The delete operation is requested, conditions allow the specified channel path to be deleted, the specified channel path is an internal-coupling-peer channel, and an internal-coupling-peer channel that is associated with the specified channel path is configured to one or more MIF images in any one or more channel subsystem images. The machine attempts to deconfigure the associated channel path from those MIF images.

3. The modify-unconditional-delete access operation is requested, conditions allow reconfiguration access to the specified channel path to be removed from the specified MIF images, and the specified channel path is configured to one or more of the specified MIF images. The machine attempts to deconfigure the specified channel path from those MIF images.

In the above cases, when a channel path is deconfigured from a MIF image, a channel-path-permanent-error-with-facility-initialized channel report is made pending for that MIF image and the channel path is no longer available for use by the program operating in the logical partition with which the MIF image is associated.

In cases 2 and 3 above, when a channel path is deconfigured from a MIF image and it is the last available channel path associated with a subchannel, the subchannel is also made not available to the MIF image. A subchannel-installed-parameters-initialized channel report is made pending for each such subchannel for each affected logical partition.

Described in detail above is processing associated with a Change Channel Path Configuration Request command. As part of the processing to support MCSS, various error checking procedures are performed, as indicated in FIGS. 6*c*–6*f* and described below.

As shown in FIG. 6*c*, when the operation code is zero indicating the adding of a CHPID to the I/O configuration definition, checks are made related to the CSSID and PCHID. If the specified checking is successful, then the CHPID is added to the channel subsystem image.

Similarly, when the operation code equals one and the operation code qualifier is set to 7 (FIG. 6*d*), then various tests are performed on the CSSID, RCSSID, and CHPID. If the checking is unsuccessful, then appropriate response codes are provided. However, when the checking is successful, then the CHPID is added to the channel subsystem image and bound to the PCHID, which is already bound to the CHPID in the referenced channel subsystem image.

With reference to FIG. 6*e*, it is shown that when the operation code is equal to one and the operation code qualifier is set to 8, then testing of the CSSID and CHPID are performed. When those tests are successful, then the CHPID is deleted from the channel subsystem image identified by the CSSID.

Similarly, in FIG. 6*f*, it is indicated that when the operation code is equal to 2, then testing is performed on the CSSID and the CHPID specified by the CSSID. When that checking is successful, then the CHPID is deleted from the channel subsystem image identified by the CSSID and the entire configuration.

As described above, a physical channel path identifier (PCHID) is used to determine the logical channel path (CHPID) to physical channel path (PCHID) binding for the specified channel subsystem image; and to correlate the specified logical channel path being added in a specified channel subsystem image with other previously added logical channel paths of other channel subsystem images that reference the same physical channel. Thus, the PCHID value serves as the correlating argument that allows the spanning group of channel paths to be formed regardless of the specified CHPID values used to access the physical channel by each respective channel subsystem image.

In one embodiment, the types of channel paths that may be configured as spanned channel paths is model dependent. Thus, a Store Configuration Component Lists CHSC command may be used to determine whether a channel path type may be configured to span channel subsystem images. As an example, FICON channel paths can be spanned. However, in other examples, other types of channel paths, as well as other I/O paths, can be spanned.

The Store Configuration Component List command is used to obtain a configuration component list containing identifiers of similar components in the I/O configuration. The type of components included in the configuration component list is determined by a component type parameter, which the program specifies in a request block. Execution of the Store Configuration Component List command does not change any information contained in the channel subsystem. The Store Configuration Component List command is executed synchronously and can be interpretively executed under a Start Interpretative Execution Facility (SIE). One embodiment of this facility is described in "IBM System/370 Extended Architecture Interpretative Execution," Publication No. SA22-7095, September 1985, which is hereby incorporated herein by reference in its entirety.

Figure 7A:
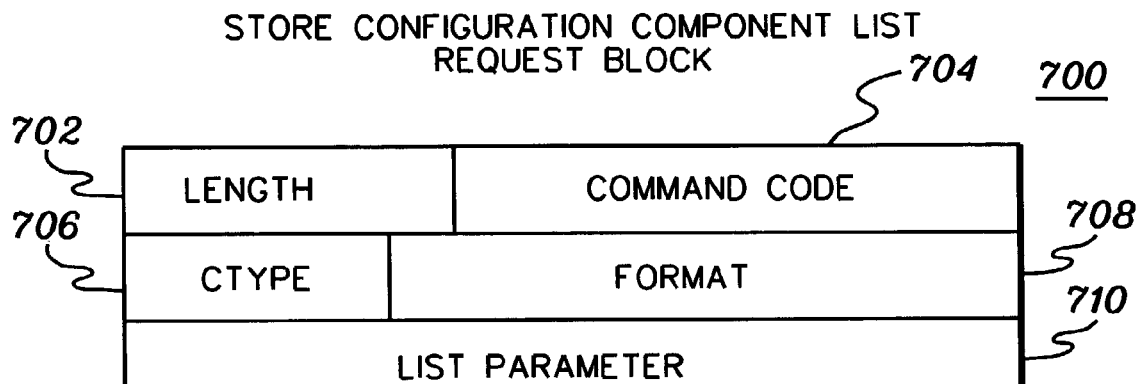
FIG. 7a depicts one embodiment of a request block for a store configuration component list command, in accordance with an aspect of the present invention.

One embodiment of a request block for a Store Configuration Component List command is described with reference to FIG. 7a. In one example, a command request block 700 for a Store Configuration Component List command includes:

(a) Length Field 702: This field specifies the length of the command request block.

(b) Command Code 704: This field specifies the store configuration component list command.

(c) Component Type (CTYPE) 706: This field contains a value that specifies the type of configuration component that is to be listed in the response block. Examples of CTYPE values are, for instance, as follows:

| CTYPE | List Description |
|---|---|
| 0 | Reserved |
| 1 | Control Units On a Channel Path: A list of the control units described in the I/O configuration as being attached to the CHPID that is specified in the list parameter field. When the multiple channel subsystem facility is provided by the CPC, byte 0 of the list parameter field is a flag byte and defined, for instance, as follows:<br>Bit   Meaning<br>0     Multiple Channel subsystem Bit (M): When bit 0 (M) is one, byte 4 of the list parameter field is checked for a valid CSSID. If valid, the value in byte 4 becomes the effective CSSID. If not valid, an appropriate response code may be stored. When M is zero, the default CSSID is the effective CSSID and byte 4 is to be zero; otherwise a response code may be stored.<br>1–7   Reserved<br>When the multiple channel subsystem facility is provided, byte 4 of the list parameter field may specify the CSSID of the target channel subsystem image that is used to locate the channel path specified in byte 7. The CSSID is subject to range and existence checking.<br>Bytes 1–3 and 5–6 of the list parameter field have no meaning and are ignored. Byte 7 of the list parameter field contains a CHPID value. |
| 2 | Channel-Path-Type Capability: A list of the types of channel-paths that can be attached to the central processing complex (CPC).<br>The list entry for each type of channel path contains an indicator that specifies whether channel path measurements can be provided for that type of channel path and an indicator that specifies whether the channel path can be configured as a spanned channel path. The contents of the list parameter field have no meaning and are ignored. |
| 3 | Reserved. |
| 4 | Channel subsystem Images, MIF Images & Logical Partitions: When the multiple channel subsystem facility is provided: A matrix that indicates which channel subsystem images and associated MIF images are configured to which logical partitions for a specified range of channel subsystem images.<br>Byte 0 of the list parameter field specifies the first CSSID in the range for which information is requested. Byte 1 of the list parameter field specifies the last CSSID in the range for which information is requested. Bytes 2–7 of the list parameter field have no meaning and are ignored. |
| 5 | Channel subsystem Image Configuration Characteristics: When the multiple channel subsystem facility is provided:<br>A matrix that indicates the validity and state of configured channel subsystem images and MIF images for a specified range of channel subsystem images.<br>Byte 0 of the list parameter field specifies the first CSSID in the range for which information is requested.<br>Byte 1 of the list parameter field specifies the last CSSID in the range for which information is requested. Bytes 2–7 of the list parameter field have no meaning and are ignored. |
| 6 | I/O-Processor & Channel-Path: A list of the IOPs of the central processing complex (CPC) that relate to the CHPID that is specified in the list parameter.<br>When the multiple channel subsystem facility is provided, byte 0 of the list parameter field is a flag byte defined, for instance, as follows: |

| CTYPE | List Description |
|---|---|
| | Bit   Meaning<br>0     Multiple Channel Subsystem Bit (M): When bit 0 is one, byte 4 of the list parameter field is checked for a valid CSSID. If valid, the value in byte 4 becomes the effective CSSID. If not valid, an appropriate response code may be stored. When M is zero, the default CSSID is the effective CSSID and the CSSID field is zero; otherwise a response code may be stored.<br>1–7   Reserved<br>When the multiple channel subsystem facility is provided, byte 4 of the list parameter field may specify the CSSID of the target channel subsystem image that is used to locate the channel path specified in byte 7. The CSSID is subject to range and existence checking.<br>Bytes 1–3 and 5–6 of the list parameter have no meaning and are ignored. Byte 7 of the list parameter contains a CHPID value. |

(d) Format (FMT) 708: The command request format field contains an unsigned integer whose value specifies the layout of the command request block.

(e) List Parameter 710: This field includes information that determines the scope of the component list for the specified component type.

The format and contents of the list parameter field are dependent on the CTYPE value. The description of each CTYPE value includes a description of the contents of the list parameter field, when that CTYPE value is specified.

Figure 7B:
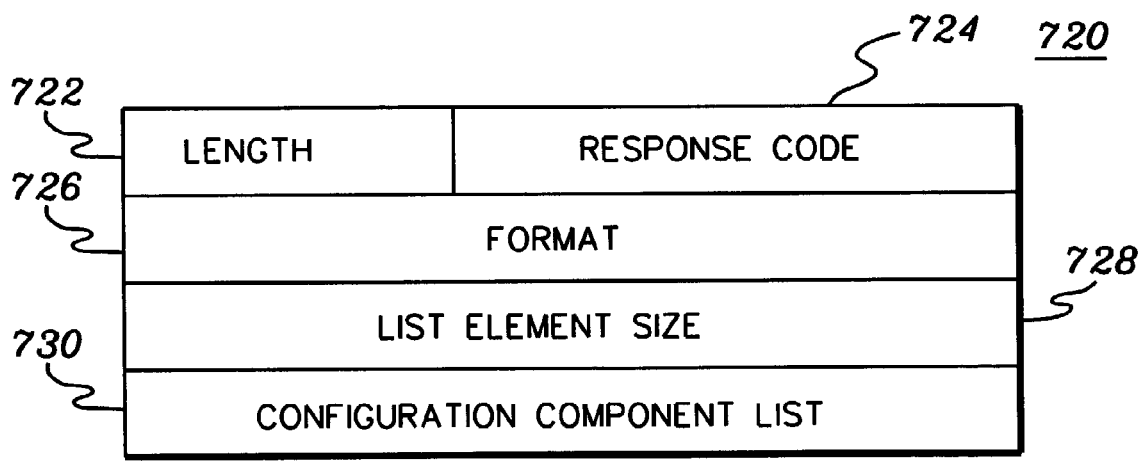
FIG. 7b depicts one embodiment of a response block for the store configuration component list command, in accordance with an aspect of the present invention.

One embodiment of a response block for a Store Configuration Component List command is described with reference to FIG. 7b. In one example, a store configuration component list response block 720 includes the following:

(a) Length Field 722: This field specifies the length of the command response code that is stored as a result of the attempt to execute the store configuration component list command.

If a response code other than an indication of success is stored in the response code field, no component list elements are stored as a result of the attempt to execute the command, and length 722 specifies a length of, for instance, eight bytes for the command response block.

If a response code indicating success is stored in the response code field, at least one component list element is stored in the command response block as a result of the execution of the command, and length 722 specifies a command response block length of, for instance, 16 bytes plus the number of component list elements stored in the configuration component list times the number of bytes specified in the list element size field.

(b) Response Code 724: This field includes an unsigned binary integer that describes the results of the attempt to execute the store configuration component list command.

(c) Format (FMT) 726: The command response format field contains an unsigned integer whose value specifies the layout of the command response block. The value of this field is, for instance, zero.

(d) List Element Size (ES) 728: This field contains an unsigned binary integer that specifies the number of bytes for each entry in the component list.

(e) Configuration Component List 730: When a response code indicating success is stored, one or more component list entries are stored in contiguous locations. The number of component list entries stored is determined by subtracting 16 bytes from the size of the command response block and dividing the remainder by the ES value.

The size and format of the component list entries are dependent on the CTYPE value. The following is a description of the component list entries for each CTYPE value defined:

| CTYPE | Component List Entry |
|---|---|
| 1 | Control Units On a Channel Path: Each component list entry is, for instance, two bytes, and includes a control unit number that identifies a control unit.<br>The control unit numbers contained in adjacent component list entries have no special numerical arrangement with regard to each other. For example, the control unit numbers may or may not be in numerical sequence from one component list entry to the next.<br>The collection of control unit numbers used to identify the collection of control units that are accessible on the specified channel path may not include every number in the numerical sequence defined by the lowest and highest control unit numbers used. |
| 2 | Channel-Path-Type Capability: Each component list entry is, for instance, two bytes. The contents of each component list entry is described as follows:<br>When one, bit 0 of byte 0 indicates that the CPC can provide channel path measurements for the specified channel path type. When zero, bit 0 indicates that the CPC does not provide channel path measurements for the specified channel path type.<br>When one, bit 1 indicates that a channel path of the specified type can be configured as a spanned channel path. When zero, bit 0 indicates that the specified channel path cannot be configured as a spanned channel path.<br>Byte 1 contains an unsigned binary integer that specifies a type of channel path that can be attached to the CPC. |
| 4 | Channel subsystem Images, MIF Images, & Logical Partitions: Each component list entry is, for instance, 16 bytes. The contents and significance of each list entry is described, for instance, as follows:<br>Each component list entry represents configuration information pertaining to a single channel subsystem image. Component list entries are stored in ascending channel subsystem image ID (CSSID) sequence beginning with the first CSSID in the range specified in the command request block.<br>The maximum number of configurable channel subsystem images is model dependent. The number of component list entries returned by this command may be equal to or less than the number in the range specified in the command request block.<br>The issuing program can determine the number of returned component list entries by using the technique described above.<br>Each byte in a component list entry represents configuration information pertaining to a MIF image within the channel subsystem image. Component list entry bytes are stored in ascending MIF image ID (IID) sequence.<br>If a component list entry byte contains a non-zero value, the value is a logical partition number (PN) and that partition is configured to the corresponding channel subsystem image and MIF image.<br>If a component list entry byte contains a zero, then no partition is configured to the corresponding channel subsystem image and MIF image.<br>In effect, this command returns a two-dimensional matrix of partition numbers that can be indexed by CSSID (row) and IID (column). Each component list entry is a complete row of the matrix. |
| 5 | Channel subsystem Image Configuration Characteristics: Each component list entry is, for instance, 16 bytes. The contents and significance of each list entry is described, for instance, as follows:<br>Each component list entry represents configuration characteristics information pertaining to a single channel subsystem image. Component list entries are stored in ascending channel subsystem image ID (CSSID) sequence beginning with the first CSSID in the range specified in the command request block.<br>The maximum number of configurable channel subsystem images is model dependent. The number of component list entries returned by this command may be equal to or less than the number in the range specified in the command request block. The issuing program can determine the number of returned component list entries by using the technique described above.<br>Each byte in a component list entry is a flag byte that represents configuration characteristics information pertaining to a MIF image within the channel subsystem image. Component list entry bytes are stored in ascending MIF image ID (IID) sequence. The meaning of each bit in each component list entry flag byte is, for instance, as follows:<br>Bit 0: When bit 0 is one, the corresponding channel subsystem image ID (CSSID) and MIF image ID (IID) are recognized as valid identifiers. When bit 0 is zero, the corresponding IID is not recognized as a valid identifier.<br>Bits 1–2: When bit 0 is one, bits 1–2 contain a value which specifies the state of the channel subsystem image identified by the recognized CSSID and the MIF image identified by the recognized IID. The values are:<br><br>Value   CSSID.IID State<br><br>0   Not configured state: There is no logical partition configured to the corresponding channel subsystem image and MIF image.<br>1   Configured state: A logical partition is configured to the corresponding channel subsystem image and MIF image.<br><br>Bit 3–7: Bits 3–7 are reserved and are zero.<br>If any of the flag bytes in a component list entry indicates a MIF image ID that is recognized, the corresponding channel subsystem image ID is also recognized. Thus, if all of the flag bytes in a component list entry indicate MIF image IDs that are not recognized, then the corresponding channel subsystem image ID is not recognized. |
| 6 | I/O Processor & Channel Path: Each component list entry is, for instance, 8 bytes. The content of each list entry is described, for instance, as follows:<br>Byte 0 contains a validity mask that applies to bytes 1–7 of the entry. Byte 0 is valid even though bit position 0 is zero. Bit positions 1–7 correspond to bytes 1–7 of the entry. When a bit in positions 1–7 is one, the corresponding byte is valid. When a bit in positions 1–7 is zero, the corresponding byte is not valid.<br>On a model where not all IOPs can access the specified channel path, byte 1 contains an IOP number of an IOP that may access the specified channel path during a start or other process. A valid IOP number is in the range of 0–255, as an example. Bytes 2–7 are reserved. |

Described in detail above is a capability that enables the sharing of channels (e.g., physical channels) across a plurality of channel subsystem images. In addition to the commands described herein, other commands may be enhanced to reflect the spanning capability. For instance, commands may be enhanced to indicate whether a particular channel is spanned, or results or indications of a command may depend on or reflect the spanning capability. Other variations are also possible.

Advantageously, the spanning channel facility provides the controls to configure a channel to multiple channel path sets that are associated with sharing logical channel subsystems and to provide native channel speed access to those shared channel paths in a manner that is transparent to the operating system images that share the channel.

Advantageously, the sharing of one or more channels by multiple channel subsystem images is performed in a manner that renders the sharing transparent to the programs operating in the collective logical partitions to which the channel subsystem images are configured. Further, advantageously, spanning can increase the maximum possible number of shareholders of a channel path. Spanning is independent of MIF channel path sharing. Neither, either, or both may be used to flexibly provide innumerable configuration possibilities, satisfying any possible configuration requirements. Spanning migrates the natural compartmentalization enforced between channel subsystem images. While the multiple channel subsystem facility provides extensibility to a CPC by breaking the limit of 256 physical channel paths that has existed, spanning provides a sharing flexibility to balance the configuration choices possible.

Although various embodiments are described above, these are only examples. Additions, deletions and/or modifications to the above embodiments may be made, without departing from the spirit of aspects of the present invention. For instance, although a computing environment is described above, many different computing environments may be used. For instance, more or less logical partitions (or other zones) may be included in the environment. Further, one or more partitions can be running in different architecture modes. Further, there may be multiple central processing complexes coupled together. These are just some of the variations that can be made without departing from the spirit from the present invention. Other variations are possible. For example, a computing environment that includes a plurality of multiple channel subsystems, one or more of which include multiple images, may be provided. Also, the computing environment need not be based on the z/Architecture.

Moreover, an environment may include an emulator (e.g., software or other emulation mechanisms), in which a particular architecture or subset thereof, is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Yet further, even though in the above embodiments, a channel path includes a control unit, this is not necessary. A channel path may not connect to a control unit or a device, such as with Ethernet channel paths or channel to channel adapters, as examples. These types of channel paths, as well as others are within the spirit of one or more aspects of the present invention.

As yet another example, although an LPAR hypervisor is given as an example, other hypervisors, such as a virtual machine hypervisor, as well as others, may be used.

Additionally, although the commands described herein have various fields, more, less or different fields may be provided. Further, the positions of the fields in the figures do not necessarily indicate the position within a control block. Other positions may be available. Similarly, although in some contexts, specific bytes or bits are described, these are only examples. Other bytes or bits may be used. Further, other sizes may be provided.

As another example, although different configuration statements are provided with various parameters, the parameters and/or statements may be different and/or others may be added or deleted.

Likewise, in a further example, even though data structures of the IOCDS are described, there may be more, different or less structures and information within the structures can vary.

The above are only some examples of the enhancements/modifications that can be made. Others are possible without departing from the spirit of one or more aspects of the present invention.

The present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of enhancing input/output processing of a computing environment, said method comprising:

configuring a channel subsystem component of the computing environment as a plurality of channel subsystems, said plurality of channel subsystems comprsing at least a first channel subsystem explicitly identified by a first channel subsystem identifier and a second channel subsystem explicitly identified by a second channel subsystem identifier;

employing, by a hypervisor of the computing environment, the first channel subsystem identifier in assigning the first channel subsystem of the channel subsystem component to a logical partition of a central processing complex of the computing environment, the first channel subsystem appearing to the logical partition as a complete channel subsystem and comprising a first plurality of channel paths configured to a first plurality of physical channels to access a first set of one or more input/output devices of the computing environment, said first set of one or more input/output devices being represented by a first set of one or more subchannels of the first channel subsystem that specify one or more first channel paths of the first plurality of channel paths to be used to access the first set of one or more input/output devices;

employing, by the hypervisor, the second channel subsystem identifier in assigning the second channel subsystem of the chammel subsystem component to another logical partition of the central processing complex, the second channel subsystem appearing to the another logical partition as a complete channel subsystem and comprising a second plurality of channel paths configured to a second plurality of physical channels to access a second set of one or more input/output devices of the computing environment, said second set of one or more input/output devices being represented by a second set of one or more subchannels of the second channel subsystem that specify one or more second channel paths of the second plurality of channel paths to be used to access the second set of one or more input/output devices;

assigning a physical channel of the computing environment to the first channel subsystem; and assigning the physical channel to the second channel subsystem, wherein the first channel subsystem and the second channel subsystem concurrently share the assigned physical channel.

2. The method of claim 1, wherein the assigning of the physical channel to the first channel subsystem comprises associating the physical channel with a channel path of the first plurality of channel paths, and the assigning of the physical channel to the second channel subsystem comprises associating the physical channel with a channel path of the second plurality of channel paths.

3. The method of claim 2, wherein the channel path of the first plurality of channel paths and the channel path of the second plurality of channel paths have a same identifier.

4. The method of claim 2, wherein the channel path of the first plurality of channel paths and the channel path of the second plurality of channel paths have different identifiers.

5. The method of claim 2, wherein the physical channel, the channel path of the first plurality of channel paths and the channel path of the second plurality of channel paths comprise a spanning group.

6. The method of claim 5, wherein the channel subsystem component has a plurality of spanning groups associated therewith, each spanning group of the plurality of the spanning groups having a different physical channel.

7. The method of claim 1, wherein at least one of the assigning of the physical channel to the first channel subsystem and the assigning of the physical channel to the second channel subsystem is performed dynamically.

8. The method of claim 7, wherein the at least one of the assigning of the physical channel to the first channel subsystem and the assigning of the physical channel to the second channel subsystem is performed dynamically via execution of an instruction by a manager of a partition coupled to the channel subsystem component.

9. The method of claim 7, wherein the at least one of the assigning of the physical channel to the first channel subsystem and the assigning of the physical channel to the second channel subsystem is performed dynamically via execution of an instruction, said instruction being emulated within the computing environment.

10. The method of claim 1, wherein at least one of the assigning of the physical channel to the first channel subsystem and the assigning of the physical channel to the second channel subsystem is facilitated by one or more emulated functions.

11. The method of claim 1, wherein the first channel subsystem and the second channel subsystem each appears to a program of the computing environment as an independent channel subsystem.

12. A system of enhancing input/output processing of a computing environment, said system comprising:

a channel subsystem component of the computing environment configured as a plurality of channel subsystems, said plurality of channel subsystems comprising at least a first channel subsystem explicitly identified by a first channel subsystem identifier and a second channel subsystem explicitly identified by a second channel subsystem identifier;

a hypervisor of the computing environment to employ the first channel subsystem identifier in assigning the first channel subsystem of the channel subsystem component to a logical partition of a central processing complex of the computing environment, the first channel subsystem appearing to the logical partition as a complete channel subsystem and comprising a first plurality of channel paths configured to a first plurality of physical channels to access a first set of one or more input/output devices of the computing environment, said first set of one or more input/output devices being represented by a first set of one or more subchannels of the first channel subsystem that specify one or more first channel paths of the first plurality of channel paths to be used to access the first set of one or more input/output devices;

the hypervisor to employ the second channel subsystem identifier in assigning the second channel subsystem of the channel subsystem component to another logical partition of the central processing complex, the second channel subsystem appearing to the another logical partition as a complete channel subsystem and comprising a second plurality of channel paths configured to a second plurality of physical channels to access a second set of one or more input/output devices of the computing environment, said second set of one or more input/output devices being represented by a second set of one or more subchannels of the second channel subsystem that specify one or more second channel paths of the second plurality of channel paths to be used to access the second set of one or more input/output devices;

a physical channel of the computing environment assigned to the first channel subsystem; and the physical channel assigned to the second channel subsystem, wherein the first channel subsystem and the second channel subsystem concurrently share the assigned physical channel.

13. The system of claim 12, further comprising means for associating the physical channel with a channel path of the first plurality of channel paths to assign the physical channel to the first channel subsystem, and means for associating the physical channel with a channel path of the second plurality of channel paths to assign the physical channel to the second channel subsystem.

14. The system of claim 13, wherein the channel path of the first plurality of channel paths and the channel path of the second plurality of channel paths have a same identifier.

15. The system of claim 13, wherein the channel path of the first plurality of channel paths and the channel path of the second plurality of channel paths have different identifiers.

16. The system of claim 13, wherein the physical channel, the channel path of the first plurality of channel paths and the channel path of the second plurality of channel paths comprise a spanning group.

17. The system of claim 16, wherein the channel subsystem component has a plurality of spanning groups associated therewith, each spanning group of the plurality of the spanning groups having a different physical channel.

18. The system of claim 12, further comprsing means for dynamically assigning the physical channel to the first channel subsystem and the second channel subsystem.

19. The system of claim 18, wherein the means for assigning dynamically comprises means for executing an instruction by a manager of a partition coupled to the channel subsystem component.

20. The system of claim 18, wherein the means for assigning dynamically comprises means for executing an instruction, said instruction being emulated within the computing environment.

21. The system of claim 12, further compmising means for assigning the physical channel to the first channel subsystem and the second channel subsystem, wherein the means for assigning to the second channel subsystem is facilitated by one or more emulated functions.

22. An article of manufacture comprising:
at least one computer usable storage medium having a computer readable program code logic, the computer readable program code logic when executed, enhances input/output processing of a computing environment, the computer readable program code logic comprising:
configure logic to configure a channel subsystem component of the computing environment as a plurality of channel subsystems, said plurality of channel subsystems comprising at least a first channel subsystem explicitly identified by a first channel subsystem identifier and a second channel subsystem explicitly identified by a second channel subsystem identifier;
employ logic to employ, by a hypervisor of the computing environment, the first channel subsystem identifier in assigning the first channel subsystem of the channel subsystem component to a logical partition of a central processing complex of the computing environment, the first channel subsystem appearing to the logical partition as a complete channel subsystem and comprising a first plurality of channel paths configured to a first plurality of physical channels to access a first set of one or more input/output devices of the computing environment, said first set of one or more input/output devices being represented by a first set of one or more subchannels of the first channel subsystem that specify one or more first channel paths of the first plurality of channel paths to be used to access the first set of one or more input/output devices;
the employ logic to employ, by the hypervisor, the second channel subsystem identifier in assigning the second channel subsystem of the channel subsystem component to another logical partition of the central processing complex, the second channel subsystem appearing to the another logical partition as a complete channel subsystem and comprising a second plurality of channel paths configured to a second plurality of physical channels to access a second set of one or more inputloutput devices of the computing environment, said second set of one or more inputloutput devices being represented by a second set of one or more subchannels of the second channel subsystem that specify one or more second channel paths of the second plurality of channel paths to be used to access the second set of one or more inputloutput devices;
assign logic to assign a physical channel of the computing environment to the first channel subsystem; and
the assign logic to assign the physical channel to the second channel subsystem, wherein the first channel subsystem and the second channel subsystem concurrently share the assigned physical channel.

23. The article of manufacture of claim 22, wherein the assign logic comprises associate logic to associate the physical channel with a channel path of the first plurality of channel paths and a channel path of the second plurality of channel paths.

24. The article of manufacture of claim 23, wherein the channel path of the first plurality of channel paths and the channel path of the second plurality of channel paths have a same identifier.

25. The article of manufacture of claim 23, wherein the channel path of the first plurality of channel paths and the channel path of the second plurality of channel paths have different identifiers.

26. The article of manufacture of claim 23, wherein the physical channel, the channel path of the first plurality of channel paths and the channel path of the second plurality of channel paths comprise a spanning group.

27. The article of manufacture of claim 26, wherein the channel subsystem component has a plurality of spanning groups associated therewith, each spanning group of the plurality of the spanning groups having a different physical channel.

28. The article of manufacture of claim 22, wherein the assign logic comprises logic to perform the assign dynamically.

29. The article of manufacture of claim 28, wherein the logic to perform the assign dynamically comprises execution logic to execute an instruction by a manager of a partition coupled to the channel subsystem component.

30. The article of manufacture of claim 22, wherein the assign logic comprises logic to perform the assign dynamically via execution of an instruction, said instruction being emulated within the computing environment.

31. The article of manufacture of claim 22, wherein the assign logic comprises one or more emulated functions.

32. A computing environment comprising:
a central processing complex having a plurality of partitions;
a channel subsystem having a first channel subsystem image explicitly identified by a first channel subsystem image identifier coupled to one or more partitions of the plurality of partitions, said first channel subsystem image appearing to the one or more partitions of the plurality of partitions as a complete channel subsystem and comprising a first plurality of channel paths configured to a first plurality of physical channels to access a first set of one or more input/output devices of the computing environment, said first set of one or more input/output devices being represented by a first set of one or more subchannels of the first channel subsystem that specify one or more first channel paths of the first plurality of channel paths to be used to access the first set of one or more input/output devices;
a second channel subsystem image explicitly identified by a second channel subsystem image identifier coupled to one or more other partitions of the plurality of partitions, said second channel subsystem image appearing to the one or more other partitions of the plurality of partitions as a complete channel subsystem and comprising a second plurality of channel paths configured to a second plurality of physical channels to access a second set of one or more input/output devices of the computing environment, said second set of one or more input/output devices being represented by a second set of one or more subchannels of the second channel subsystem that specify one or more second channel paths of the second plurality of channel paths to be used to access the second set of one or more input/output devices; and a physical channel coupled to the first channel subsystem image and the second channel subsystem image, wherein the first channel subsystem image and the second channel subsystem image concurrently share the physical channel.

* * * * *